United States Patent
Che et al.

(10) Patent No.: US 8,120,866 B2
(45) Date of Patent: Feb. 21, 2012

(54) METHOD FOR CHARACTERIZING A MAGNETIC-RECORDING SYSTEM FOR THE PRESENCE OF ADJACENT-TRACK INTERFERENCE AND FAR-TRACK INTERFERENCE

(75) Inventors: Xiaodong Che, Saratoga, CA (US); Zhen Jin, Fremont, CA (US); Michael Salo, San Jose, CA (US); Roger Wood, Gilroy, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 128 days.

(21) Appl. No.: 12/511,702

(22) Filed: Jul. 29, 2009

(65) Prior Publication Data
US 2011/0026154 A1   Feb. 3, 2011

(51) Int. Cl.
G11B 27/36 (2006.01)
G11B 5/03 (2006.01)

(52) U.S. Cl. .......................................... 360/31; 360/66
(58) Field of Classification Search .................. None
See application file for complete search history.

(56) References Cited

U.S. PATENT DOCUMENTS

| | | | |
|---|---|---|---|
| 4,516,165 A * | 5/1985 | Cunningham et al. ........... 360/53 |
| 5,075,623 A | 12/1991 | Matsuda et al. | |
| 5,600,500 A * | 2/1997 | Madsen et al. .................. 360/46 |
| 5,602,473 A | 2/1997 | Mizoh et al. | |
| 6,297,630 B1 | 10/2001 | Dietzel et al. | |
| 6,437,562 B2 | 8/2002 | Abe | |
| 6,842,304 B2 | 1/2005 | Chliwnyj et al. | |
| 6,870,697 B2 * | 3/2005 | Ikekame et al. ................. 360/46 |
| 6,943,545 B2 | 9/2005 | Patland et al. | |
| 2008/0080587 A1 | 4/2008 | Inomata | |
| 2008/0174905 A1 | 7/2008 | Ueda | |

* cited by examiner

Primary Examiner — Daniell L Negron

(57) ABSTRACT

A method for characterizing a magnetic-recording system for the presence of adjacent-track interference and far-track interference. The method includes writing a plurality of repeating pulse-waveforms on a data track of a magnetic-recording disk at a write element of a magnetic-recording head. The method further includes reading a plurality of read-back signals from the magnetic-recording disk over a band of pseudo-data tracks offset from the data track by corresponding pseudo-data-track offsets in a radial direction of the magnetic-recording disk at a read element of the magnetic-recording head. In addition, the method includes displaying a magnetic-recording-signature map synthesized from the read-back signals from the magnetic-recording disk.

7 Claims, 17 Drawing Sheets

METHOD FOR CHARACTERIZING A MAGNETIC-RECORDING SYSTEM FOR THE PRESENCE OF ADJACENT-TRACK INTERFERENCE AND FAR-TRACK INTERFERENCE

TECHNICAL FIELD

Embodiments of the present invention relate generally to the field of magnetic-recording-head, magnetic-recording-disk and hard-disk-drive design and manufacturing.

BACKGROUND

The magnetic-recording, hard-disk-drive (HDD) industry is extremely competitive. The demands of the market for ever increasing storage capacity, as bench-marked by areal density, create tremendous pressure for achieving technological advancements. Therefore, procedures that can lead to greater understanding of the magnetic-recording process in advanced HDD technology attract significant attention on the part of engineers and scientists engaged in the design of these complex devices.

With the arrival of ultra-high-density (UHD), magnetic-recording technology, the desire for understanding the magnetic-recording process has gained even greater importance. In particular, perpendicular-magnetic-recording (PMR) heads used in UHD HDDs have attracted significant attention from the HDD engineering community, because the write characteristics of PMR heads can have a significant impact on the track density, as measured in tracks per inch (tpi), as data tracks are packed ever closer together in UHD HDDs. Thus, greater understanding of the write characteristics of PMR heads and disks that affect areal density in UHD HDDs is of paramount importance.

SUMMARY

Embodiments of the present invention include a method for characterizing a magnetic-recording system for the presence of adjacent-track interference and far-track interference. The method includes writing a plurality of repeating pulse-waveforms on a data track of a magnetic-recording disk at a write element of a magnetic-recording head. The method further includes reading a plurality of read-back signals from the magnetic-recording disk over a band of pseudo-data tracks offset from the data track by corresponding pseudo-data-track offsets in a radial direction of the magnetic-recording disk at a read element of the magnetic-recording head. In addition, the method includes displaying a magnetic-recording-signature map synthesized from the read-back signals from the magnetic-recording disk.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Figure 1:
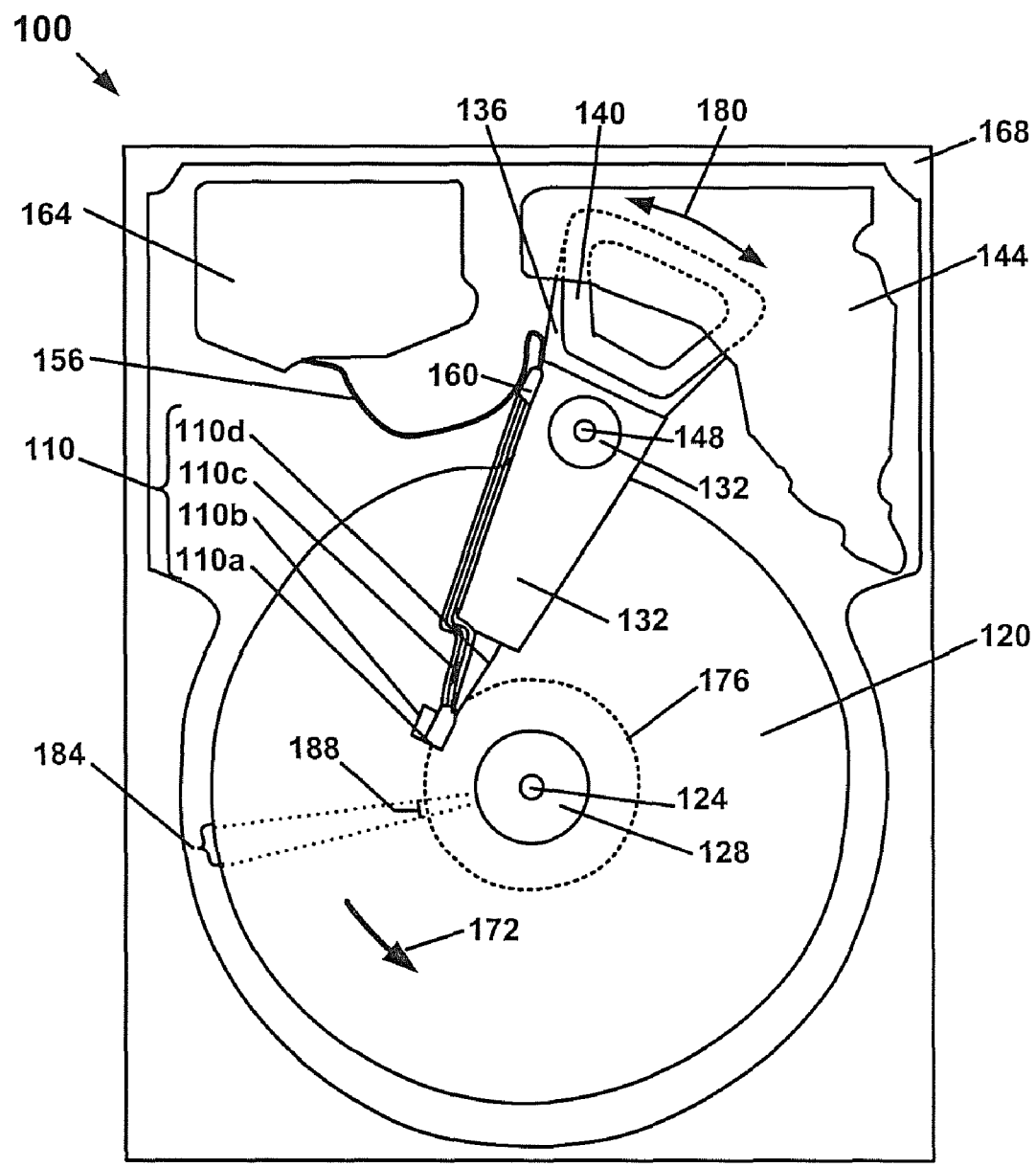
FIG. 1 is plan view of an example magnetic-recording system, for example, a hard-disk drive (HDD), illustrating an example environment in which a method for characterizing the magnetic-recording system for the presence of adjacent-track interference (ATI) and far-track interference (FTI) may be practiced, in an embodiment of the present invention.

Description of Embodiments of the Present Invention for a Method for Characterizing a Magnetic-Recording System for the Presence of Adjacent-Track Interference and Far-Track Interference With reference to FIG. 1, in accordance with an embodiment of the present invention, a plan view of an example magnetic-recording system, for example, a HDD 100, is shown. The HDD 100 may serve as an example environment in which a method for characterizing the magnetic-recording system for the presence of adjacent-track interference (ATI) and far-track interference (FTI) may be practiced. However, embodiments of the present invention are not limited to a magnetic-recording system that is an HDD, as the method for characterizing the magnetic-recording system for the presence of ATI and FTI may be practiced more generally in other environments, for example, on a test stand, or alternatively on a manufacturing line, without limitation thereto, as is subsequently described. Moreover, the embodiments of the present invention next described as applied to the HDD 100 that are also germane to the environments of a test stand, or alternatively a manufacturing line, are incorporated into the subsequent description herein of embodiments of the present invention practiced on a test stand, or alternatively a manufacturing line.

In accordance with embodiments of the present invention, as used herein, ATI and FTI are used to describe a mechanism of degradation of the information recorded on a magnetic-recording disk at a data track, which is actually the erasure or partial-erasure of the recorded information at the data track that is often associated with an increase in background noise of the wanted read-back signal from the data track. ATI and FTI are well-known terms of art in the magnetic-recording arts. Unfortunately, ATI and FTI are themselves something of misnomers, because ATI and FTI suggest that read-back signal degradation occurs because of the presence of an undesired signal that is interfering with the wanted read-back signal from the data track. To avoid confusion, the alternative term of art, adjacent-track erasure (ATE) has sometimes been used in place of ATI; and, the alternative terms of art, far-track erasure (FTE), alternatively known as wide-area, track erasure (WATER) have sometimes been used in place of FTI. As used herein, ATI is to be understood as being synonymous with ATE; and, FTI is to be understood as being synonymous with FTE, or alternatively WATER.

With further reference to FIG. 1, in accordance with an embodiment of the present invention, the functional arrangement of components of the HDD 100, in which the method for characterizing the magnetic-recording system for the presence of ATI and FTI may be practiced, are illustrated. The HDD 100 includes at least one head-gimbal assembly (HGA) 110 including a magnetic-recording head 110a, a lead suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the magnetic-recording disk 120. The magnetic-recording head 110a includes a write element, a so-called writer, and a read element, a so-called reader, for respectively writing and reading information stored on the magnetic-recording disk 120 of the HDD 100. The magnetic-recording disk 120 or a plurality (not shown) of magnetic-recording disks may be affixed to the spindle 124 with a disk clamp 128. The HDD 100 further includes an arm 132 attached to the HGA 110, a voice-coil motor (VCM) that includes an armature 136 including a voice coil 140 attached to the arm 132; and a stator 144 including a voice-coil magnet (not shown); the armature 136 of the VCM is attached to the arm 132 and is configured to move the arm 132 and the HGA 110 to access portions of the magnetic-recording disk 120 being mounted on a pivot 148 with an interposed pivot bearing 152.

With further reference to FIG. 1, in accordance with an embodiment of the present invention, electrical signals, for example, current to the voice coil 140 of the VCM, write signal to and read signal from the magnetic-recording head 110a, are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown)

provided by an HDD housing 168. The HDD housing 168, also referred to as a casting, in conjunction with an HDD cover (not shown) provides a sealed, protective enclosure for the information storage components of the HDD 100.

With further reference to FIG. 1, in accordance with an embodiment of the present invention, other electronic components (not shown), including as a disk controller and servo electronics including a digital-signal processor (DSP), provide electrical signals to the drive motor, the voice coil 140 of the VCM and the magnetic-recording head 110a of the HGA 110. The electrical signal provided to the drive motor enables the drive motor to spin providing a torque to the spindle 124 which is in turn transmitted to the magnetic-recording disk 120 that is affixed to the spindle 124 by the disk clamp 128; as a result, the magnetic-recording disk 120 spins in a direction 172. The spinning magnetic-recording disk 120 creates a cushion of air that acts as an air bearing on which an air-bearing surface (ABS) of the slider 110b rides so that the slider 110b flies above the surface of the magnetic-recording disk 120 without making contact with a thin magnetic-recording medium of the magnetic-recording disk 120 in which information is recorded. The electrical signal provided to the voice coil 140 of the VCM enables the magnetic-recording head 110a of the HGA 110 to access a track 176 on which information is recorded. Thus, the armature 136 of the VCM swings through an arc 180 which enables the HGA 110 attached to the armature 136 by the arm 132 to access various tracks on the magnetic-recording disk 120. Information is stored on the magnetic-recording disk 120 in a plurality (not shown) of concentric tracks arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the magnetic-recording head 110a of the HGA 110 reads the servo-burst-signal pattern which provides information to the servo electronics, which controls the electrical signal provided to the voice coil 140 of the VCM, which is used to control the motion of the rotary actuator including arm 132, HGA 110, and armature 136 to enable access of the track 176 on the magnetic-recording disk 120 by magnetic-recording head 110a. Upon finding the track 176 and identifying a particular sectored track portion 188, the magnetic-recording head 110a either reads data from the track 176 or writes data to the track 176 depending on instructions received by the disk controller from an external agent, for example, a microprocessor of a computer system.

Figure 2A:
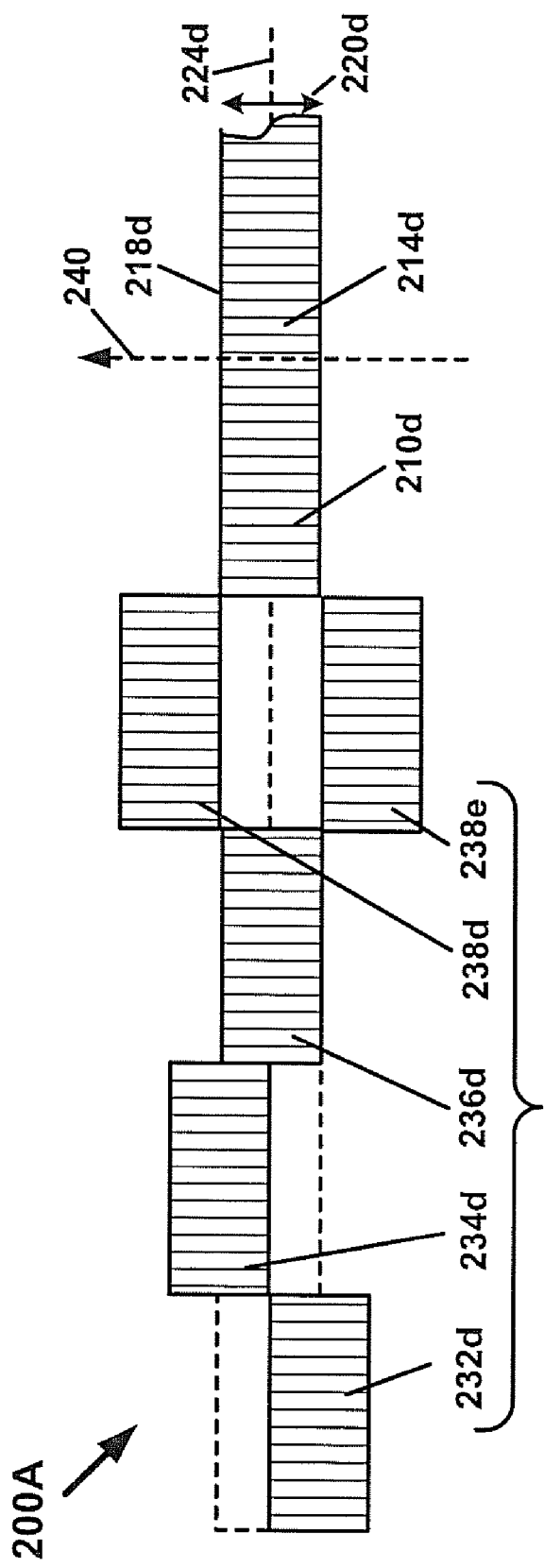
FIG. 2A is plan view of a portion of a track including a data track and a ABCD-servo-burst-signal pattern illustrating the motion of a magnetic-recording head across the data track for characterizing a magnetic-recording system, for example, the HDD of FIG. 1, for the presence of ATI and FTI, in an embodiment of the present invention.

With reference now to FIG. 2A, in accordance with an embodiment of the present invention, a plan view of a portion of a track 200A on magnetic-recording disk 120 including a data track 210d and an ABCD-servo-burst-signal pattern 230d is shown. FIG. 2A illustrates the motion of the magnetic-recording head 110a across the data track 210d, in a crosstrack direction, indicated by the direction of arrow 240, for characterizing a magnetic-recording system, for example, HDD 100, for the presence of ATI and FTI. A plurality of repeating pulse-waveforms is written on the data track 210d of a magnetic-recording disk, for example, magnetic-recording disk 120, with the write-element of the magnetic-recording head 110a; the magnetic-recording head 110a is parked at a particular radial location on the magnetic-recording disk 120 by the rotary actuator at the center of track 200A, given by track-center 224d, and the data track 210d is written on the magnetic-recording disk 120 corresponding to the track 176 shown in FIG. 1. A plurality of read-back signals from the magnetic-recording disk 120 over a band of pseudo-data-tracks offset from the data track 210d by corresponding pseudo-data-track offsets in a radial direction of the magnetic-recording disk 120 are read with the read element of the magnetic-recording head 110a. In reading the plurality of read-back signals from the magnetic-recording disk 120, the rotary actuator with attached magnetic-recording head 110a may be moved incrementally along a radial direction, in the crosstrack direction, indicated by the direction of arrow 240, of the magnetic-recording disk 120 along a path indicated by arrow 240, which is perpendicular to the data track 210d. The path indicated by arrow 240 may be broken up into a plurality of equal incremental steps starting at a position at least about one track width 220d from a track-edge 214d and ending at a position at least about one track width 220d from a track-edge 218d. As the magnetic-recording head 110a is moved along the path indicated by arrow 240, the amplitude of the output from the read-element of the magnetic-recording head 110a from the read-back signals is read and may be used to synthesize a magnetic-recording-signature map as a two-dimensional (2-D) function of position given by the pseudo-data-track offset from track-center 224d and by circumferential location along the data track 210d. In addition, the output from the read-element of the magnetic-recording head 110a may be displayed as the magnetic-recording-signature map synthesized from the read-back signals from the magnetic-recording disk 120, which is subsequently described in greater detail in the discussion of FIGS. 4 and 5.

With further reference to FIG. 2A, in accordance with an embodiment of the present invention, a portion of the track 200A including the ABCD-servo-burst-signal pattern 230d is shown. FIG. 2A also illustrates the separate A, B and C servo-burst-signal fields 232d, 234d and 236d, respectively, and D servo-burst-signal fields 238d and 238e. In one embodiment of the present invention, the radial location of the track-center 224d for writing a plurality of repeating pulse-waveforms on the data track 210d of the magnetic-recording disk 120 by the write element of the magnetic-recording head 110a is determined by the position error signal (PES) obtained by reading the A, B and C servo-burst-signal fields 232d, 234d and 236d, respectively, and D servo-burst-signal fields 238d and 238e. Moreover, the radial location of a pseudo-data track for reading the read-back signals from the magnetic-recording disk 120 over a band of pseudo-data tracks offset from the data track 210d by corresponding pseudo-data-track offsets in a radial direction of the magnetic-recording disk 120 is determined by the PES obtained by reading the A, B and C servo-burst-signal fields 232d, 234d and 236d, respectively, and D servo-burst-signal fields 238d and 238e. However, the PES obtained by reading the A, B and C servo-burst-signal fields 232d, 234d and 236d, respectively, and D servo-burst-signal fields 238d and 238e, which is suitable for positioning the magnetic-recording head 110a to characterize ATI, becomes increasing weaker with departure from the track-center 224d greater than about one track width 220d. Therefore, to characterize FTI, additional means for positioning the magnetic-recording head 110a is provided, as is next described.

Figure 2B:
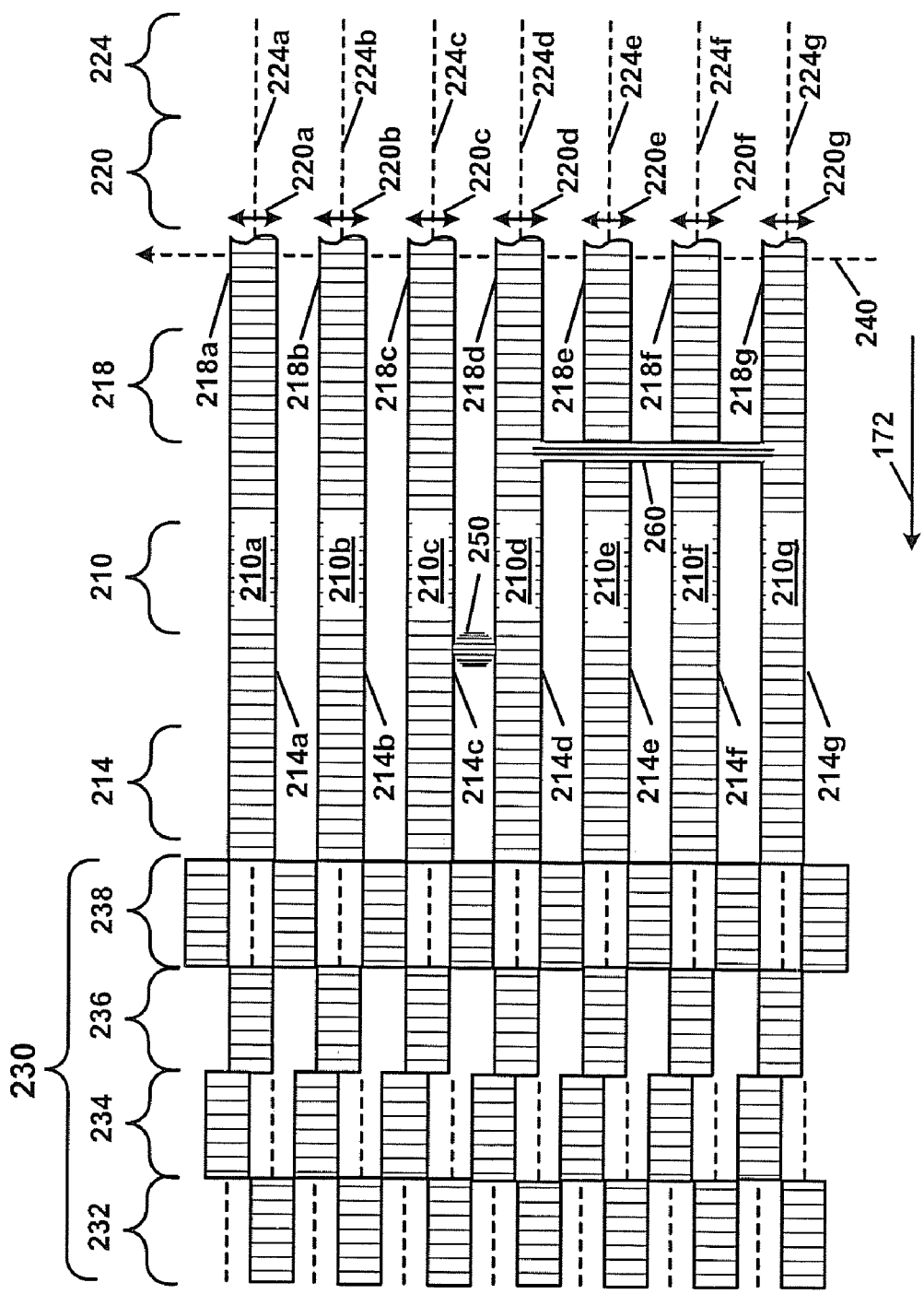
FIG. 2B is plan view of a band of tracks including a band of data tracks and bands of ABCD-servo-burst-signal patterns offset from the track-center of the data track, written by the magnetic-recording head, by corresponding track offsets in a radial direction of the magnetic-recording disk illustrating "hot spots" associated with the presence of ATI and FTI and the motion of a magnetic-recording head across the data track for characterizing a magnetic-recording system, for example, the HDD of FIG. 1, for the presence of ATI and FTI, in an embodiment of the present invention.

With reference now to FIG. 2B, in accordance with an embodiment of the present invention, a plan view of a band 200B of tracks on the magnetic-recording disk 120 is shown that includes a band 210 of data tracks 210a-210g and a plurality 230 of bands 232, 234, 236 and 238 of ABCD-servo-burst-signal patterns offset from the track-center 224d of the track 200A by corresponding track offsets in a radial direction of the magnetic-recording disk 120. The band 210 of data tracks 210a-210g is written by the magnetic-recording head 110a. Similarly, the plurality 230 of bands 232, 234, 236 and 238 of ABCD-servo-burst-signal patterns are written by the magnetic-recording head 110a, although written in a separate operation, for example, in a self-servo writing procedure. FIG. 2B illustrates "hot spots" 250 and 260 associated with the presence of ATI and FTI, respectively, and the motion of the magnetic-recording head 110a across the data track 210d, in the crosstrack direction, indicated by the direction of arrow 240, for characterizing a magnetic-recording system, for example, the HDD of FIG. 1, for the presence of ATI and FTI. Each of the data tracks 210a, 210b, 210c, 210d, 210e, 210f and 210g in the band 210 of data tracks 210a-210g has corresponding inside-diameter (ID) track-edges 214a, 214b, 214c, 214d, 214e, 214f and 214g in the plurality 214 of ID track-edges 214a-214g, and corresponding outside-diameter (OD) track-edges 218a, 218b, 218c, 218d, 218e, 218f and 218g in the plurality 218 of OD track-edges 218a-218g. Similarly, each of the data tracks 210a, 210b, 210c, 210d, 210e, 210f and 210g in the band 210 of data tracks 210a-210g has corresponding track-centers 224a, 224b, 224c, 224d, 224e, 224f and 224g in the plurality 224 of track-centers 224a-224g, and corresponding track widths 220a, 220b, 220c, 220d, 220e, 220f and 220g in the plurality 220 of track widths 220a-220g. As shown in FIG. 2B, the arrowhead of the arrow 240 is directed towards the OD of the magnetic-recording disk 120. The direction 172 in which the magnetic-recording disk 120 spins is also shown. The band 200B of tracks is arranged as a plurality of tracks that are equally spaced in the radial direction, indicated by the arrow 240. Similarly, the band 210 of data tracks 210a-210g is arranged as a plurality of tracks that are equally spaced in the radial direction. The bands 232, 234, 236 and 238 of ABCD-servo-burst-signal patterns are read by the read element of the magnetic-recording head 110a. The magnetic-recording head 110a is then positioned over the data track to be written, for example, data track 210d. The signature of ATI may appear as anomalous written intensity, a so-called "hot spot," for example, hot spot 250, adjacent to a written data track, for example, data track 210d, that bridges the space between the written data track and an adjacent data track, for example, data track 210c, interfering with, or rather erasing, the information recorded on the adjacent data track. FTI is similar to ATI, except that it affects data tracks further displaced than data tracks in close proximity to the written data track. Thus, the signature of FTI may appear as anomalous written intensity, a so-called hot spot, for example, hot spot 260, more distant from the written data track, for example, data track 210d, that bridges the space between the written data track and the further displaced data track, for example, as shown, either one of data tracks 210f and 210g, interfering with, or rather erasing, the information recorded on the further displaced data track.

Figure 3A:
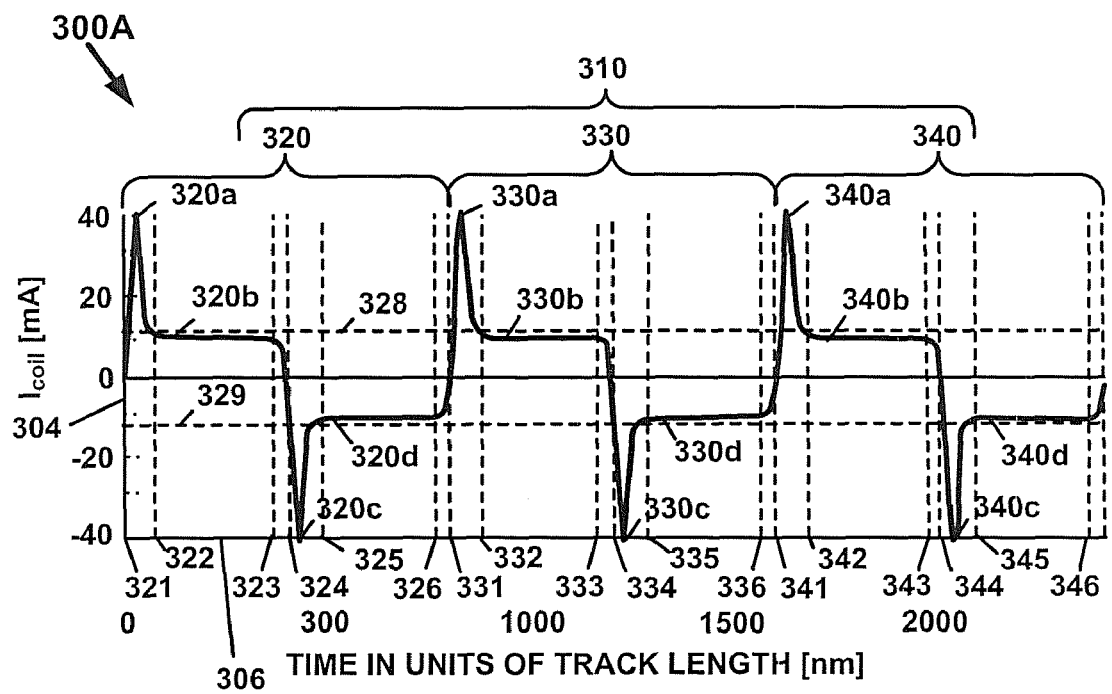
FIG. 3A is a plot of a plurality of repeating pulse-waveforms written by the write element of the magnetic-recording head on a data track of a magnetic-recording disk for characterizing a magnetic-recording system, for example, the HDD of FIG. 1, for the presence of ATI and FTI, in an embodiment of the present invention.

With reference now to FIG. 3A and further reference to FIG. 2B, in accordance with an embodiment of the present invention, the method for characterizing a magnetic-recording system for the presence of ATI and FTI is next described in greater detail. In FIG. 3A, a plot 300A of a plurality 310 of repeating pulse-waveforms 320, 330 and 340 written by the write element of the magnetic-recording head 110a on the data track 210d of the magnetic-recording disk 120 for characterizing a magnetic-recording system, for example, the HDD of FIG. 1, for the presence of ATI and FTI is shown. Ordinate 304 of the plot 300A is given in units milliAmperes (mA) of coil current, $I_{coil}$, provide to the write element of the magnetic-recording head 110a. Abscissa 306 of the plot 300A is given in units of time as measured in units of track length in nanometers (nm); because the time base for the pulse-waveform can change with the rotational speed of the spindle, in other words, the revolutions per minute (rpm) for a particular HDD design, the units of time are given in terms of the corresponding position of the written pulse-waveform along the length of the data track that is written with the pulse-waveform. The magnetic-recording disk 120 is spun up and the magnetic-recording head 110a is loaded onto the magnetic-recording disk 120. The data track 210d to be written is selected. The rotary actuator positions magnetic-recording head 110a over the track-center 224d where the data track 210d is to be written. Information for positioning the magnetic-recording head 110a over the track-center 224d is provided by the reading the A, B and C servo-burst-signal fields 232d, 234d and 236d, respectively, and D servo-burst-signal fields 238d and 238e of track 200A, which provides the PES for positioning the magnetic-recording head 110a over the track-center 224d to the servo electronics that control the position of the rotary actuator.

With further reference to FIGS. 2B and 3A, in accordance with an embodiment of the present invention, the magnetic-recording disk 120 is then written with a plurality of repeating pulse-waveforms on the data track 210d of the magnetic-recording disk 120 at the write element of a magnetic-recording head 110a. As shown in FIG. 3A, the plurality of repeating pulse-waveforms includes the plurality 310 of repeating pulse-waveforms 320, 330 and 340; but, embodiments of the present invention are not limited to the plurality of repeating pulse-waveforms as shown in FIG. 3A, as more than one pulse-waveform included in the plurality of pulse-waveforms, in particular, more than three pulse-waveforms as shown in FIG. 3A, is within the spirit and scope of the embodiments of the present invention. A pulse-waveform of the plurality of repeating pulse-waveforms further includes a positive pulse portion, a positive plateau portion, a negative pulse portion and a negative plateau portion. For example, pulse-waveform 320 includes: a positive pulse portion 320a that is located between the leading edge of the positive pulse portion 320a given by abscissa value 321 and the trailing edge to the positive pulse portion 320a given by abscissa value 322; a positive plateau portion 320b, located between the beginning of the positive plateau portion 320b given by abscissa value 322 and the end of the positive plateau portion 320b given by abscissa value 323; a negative pulse portion 320c, located between the leading edge of the negative pulse portion 320c given by abscissa value 324 and the trailing edge to the negative pulse portion 320c given by abscissa value 325; and, a negative plateau portion 320d, located between the beginning of the negative plateau portion 320d given by abscissa value 325 and the end of the negative plateau portion 320d given by abscissa value 326. Similarly, pulse-waveform 330 includes: a positive pulse portion 330a that is located between the leading edge of the positive pulse portion 330a given by abscissa value 331 and the trailing edge to the positive pulse portion 330a given by abscissa value 332; a positive plateau portion 330b, located between the beginning of the positive plateau portion 330b given by abscissa value 332 and the end of the positive plateau portion 330b given by abscissa value 333; a negative pulse portion 330c, located between the leading edge of the negative pulse portion 330c given by abscissa value 334 and the trailing edge to the negative pulse portion 330c given by abscissa value 335; and, a negative plateau portion 330d, located between the beginning of the negative plateau portion 330d given by abscissa value 335 and the end of the negative plateau portion 330d given by abscissa value 336. Likewise, pulse-waveform 340 includes: a positive pulse portion 340a that is located between the leading edge of the positive pulse portion 340*a* given by abscissa value 341 and the trailing edge to the positive pulse portion 340*a* given by abscissa value 342; a positive plateau portion 340*b*, located between the beginning of the positive plateau portion 340*b* given by abscissa value 342 and the end of the positive plateau portion 340*b* given by abscissa value 343; a negative pulse portion 340*c*, located between the leading edge of the negative pulse portion 340*c* given by abscissa value 344 and the trailing edge to the negative pulse portion 340*c* given by abscissa value 345; and, a negative plateau portion 340*d*, located between the beginning of the negative plateau portion 340*d* given by abscissa value 345 and the end of the negative plateau portion 340*d* given by abscissa value 346. For a given pulse-waveform, the width of a positive pulse portion may equal the width of a negative pulse portion, and the width of a positive plateau portion may equal the width of a negative plateau portion, as shown in FIG. 3A, without limitation thereto, as positive and negative pulse portions that are unequal in width, and positive and negative plateau portions that are unequal in width are also within the spirit and scope of embodiments of the present invention.

With further reference to FIGS. 2B and 3A, in accordance with an embodiment of the present invention, the plurality of repeating pulse-waveforms used to write the data track 210*d* has a low-frequency. The low frequency is defined by a distance between portions of the magnetic-recording disk written by pulse portions of the pulse-waveforms being greater than 100 nm, for example, corresponding to the distance between the trailing edge of the negative pulse portion 320*c* of pulse-waveform 320 and the leading edge of the positive pulse portion 330*a* of pulse-waveform 330 given by the distance between abscissa value 325 and abscissa value 331. The positive plateau portion of a pulse-waveform, for example, the positive plateau portion 320*b* of the pulse-waveform 320, may be set at a level below a level 328 sufficient to write the magnetic-recording disk 120. Similarly, the negative plateau portion of a pulse-waveform, for example, the negative plateau portion 320*d* of the pulse-waveform 320, may be set at a level above a level 329 sufficient to write the magnetic-recording disk 120. As used herein, level 328 or 329 sufficient to write a magnetic-recording disk is a coil current sufficient to produce a magnetic flux density emanating from the write element of the magnetic-recording head such that the modulus of magnetic flux density vector at the magnetic-recording medium of a magnetic-recording disk exceeds the absolute value of the coercivity of the magnetic-recording medium of the magnetic-recording disk. In addition, in accordance with an embodiment of the present invention, the method for characterizing a magnetic-recording system for the presence of ATI and FTI may further include repeating the writing the data track on the magnetic-recording disk with the plurality of repeating pulse-waveforms. Repeating the writing the data track on the magnetic-recording disk with the plurality of repeating pulse-waveforms may enhance the visibility of a hot spot associated with ATI or FTI appearing in a magnetic-recording-signature map.

With further reference to FIGS. 2B and 3A, in accordance with one embodiment of the present invention, peak amplitude of a positive pulse portion of a pulse-waveform may exceed the level, in other words, the amplitude, of the positive plateau portion by three times. For example, the amplitude of the positive plateau portion as shown in FIG. 3A is nominally slightly less than about 10 mA so that the peak amplitude of the positive pulse portion of the pulse-waveform is about 40 mA. Similarly, absolute value of peak amplitude of a negative pulse portion of a pulse-waveform may exceed the absolute value of the level, in other words, the amplitude, of the negative plateau portion by three times. For example, the absolute value of the amplitude of the negative plateau portion as shown in FIG. 3A is nominally slightly less than about 10 mA so that the absolute value of the peak amplitude of the negative pulse portion of the pulse-waveform is about 40 mA. Moreover, the width, in other words, the time interval between the leading edge and the trailing edge, of the pulse portion, whether positive or negative, of the pulse-waveform is on the order of 100 picoseconds (ps). In an embodiment of the present invention, a range for the width of the pulse portion of the pulse-waveform is less than about 1 ns; the range for the width of the pulse portion of the pulse-waveform will therefore vary with the rotational speed of the disk, which may vary between about 3600 rpm and 15,000 rpm. In an embodiment of the present invention, the pulse width of the pulse portion of the pulse-waveform is nominally less than about 100 nm and the spacing, in other words, the time interval, between a positive pulse portion and a negative pulse portion of the pulse-waveform is greater than about 100 nm, as measured in units of track length. As shown in FIG. 3A, the spacing between a positive pulse portion in the negative pulse portion of the pulse-waveform may be greater than about 300 nm, as measured in units of track length.

Figure 3B:
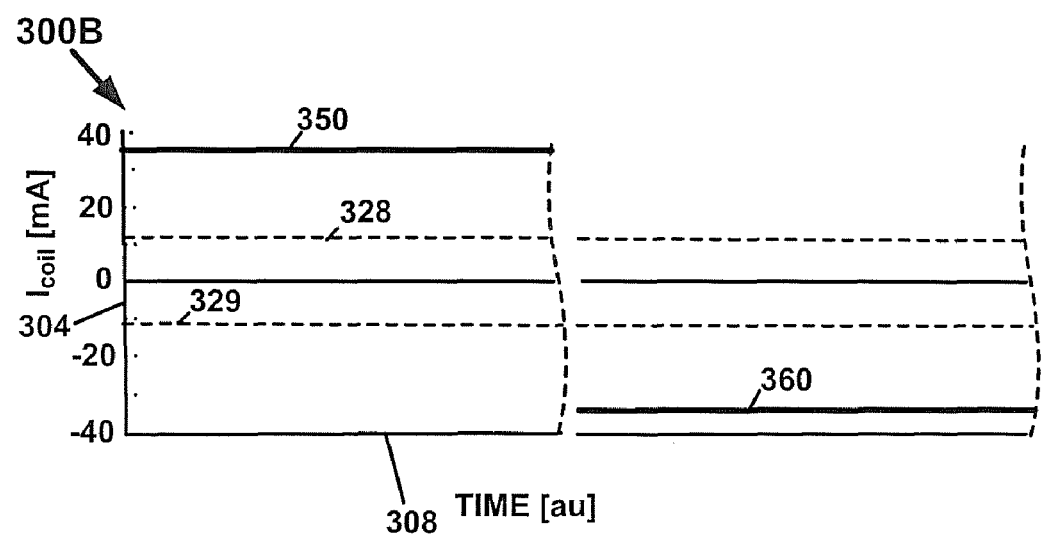
FIG. 3B is a plot of two direct-current (DC) erase waveforms that may be written by the write element of the magnetic-recording head to erase a plurality of pseudo-data tracks over a band of pseudo-data tracks offset from the data track by corresponding pseudo-data-track offsets in the radial direction of the magnetic-recording disk for characterizing a magnetic-recording system, for example, the HDD of FIG. 1, for the presence of ATI and FTI, in an embodiment of the present invention.

With further reference to FIGS. 2B and 3B, in accordance with an embodiment of the present invention, a plot 300B of two direct-current (DC) erase waveforms 350 and 360 is shown. Ordinate 304 of the plot 300B is given in units milli-Amperes (mA) of coil current, $I_{coil}$, provide to the write element of the magnetic-recording recording head 110*a*. Abscissa 308 of the plot 300B is given in arbitrary units of time. However, the length of time that a DC-erase waveform, for example, DC-erase waveform 350 or 360, is maintained at a level of constant coil current may equal or exceed the length of a plurality of repeating pulse-waveforms, for example, plurality 310 of repeating pulse-waveforms 320, 330 and 340, as measured in units of track length, for example, in nanometers (nm). The DC-erase waveform 350 or 360 may be written by the write element of the magnetic-recording head to erase a plurality of pseudo-data tracks over a band of pseudo-data tracks offset from the data track by corresponding pseudo-data-track offsets in the radial direction of the magnetic-recording disk for characterizing a magnetic-recording system, for example, the HDD of FIG. 1, for the presence of ATI and FTI. As used herein, a pseudo-data track is a locus of recorded information at a radial position of the magnetic-recording disk that is offset from a track-center of a written data track, for example, track-center 224*d* of data track 210*d*. The offset from a track-center of a written data track, for example, data track 210*d*, is referred to herein as the pseudo-data-track offset. The pseudo-data-track offset may be set at a value that positions the magnetic-recording head 110*a* at a location offset from a track-center of a written data track, for example, track-center 224*d* of data track 210*d*. The information for positioning the magnetic-recording head 110*a* at the track-center of a pseudo-data track corresponding to the value of the pseudo-data-track offset is provided by the reading the A, B and C servo-burst-signal fields 232*d*, 234*d* and 236*d*, respectively, and D servo-burst-signal fields 238*d* and 238*e* of track 200A associated with the written data track, for example, data track 210*d*, which provides the PES to the servo electronics that control the position of the rotary actuator for positioning the magnetic-recording head 110*a* at the track-center of the pseudo-data track corresponding to the value of the pseudo-data-track offset. The method for characterizing the magnetic-recording system for the presence of ATI and FTI may further include erasing a plurality of pseudo-data tracks over a band of pseudo-data tracks offset from the data track by the corresponding pseudo-data-track offsets at a write element of a magnetic-recording head. The corresponding pseudo-data tracks are offset in the radial direction of the magnetic-recording disk. To enhance the visibility of the magnetic-recording-signature map, the erasing may utilize a DC erasing with a DC-erase waveform as described above, for example, DC-erase waveform 350 or 360, that precedes writing the plurality of repeating pulse-waveforms on a data track, for example, data track 210*d*, of a magnetic-recording disk at a write element of a magnetic-recording head. The absolute value of the amplitude of the DC-erase waveform is at a level greater than the level 328 or 329 sufficient to write a magnetic-recording disk that is produced by a coil current sufficient to produce a magnetic flux density emanating from the write element of the magnetic-recording head such that the modulus of magnetic flux density vector at the magnetic-recording medium of a magnetic-recording disk exceeds the absolute value of the coercivity of the magnetic-recording medium of the magnetic-recording disk. In this manner, a DC-erased band of data tracks is prepared to accept the subsequently recorded plurality of repeating pulse-waveforms on a data track, for example, data track 210*d*, of a magnetic-recording disk at a write element of a magnetic-recording head.

With further reference to FIGS. 2B and 3A, in accordance with one embodiment of the present invention, the absolute value of the amplitude the DC-erase waveform 350 or 360, whether positive or negative, is on the order of four times the level 329 sufficient to write the magnetic-recording disk 120. For example, as shown in FIG. 3B, the absolute value of the amplitude of the positive DC-erase waveform 350 is about 40 mA; similarly, the absolute value of the amplitude of the negative DC-erase waveform 360 is about 40 mA. Also, in accordance with an embodiment of the present invention, the range of the plurality of pseudo-data tracks over a band of pseudo-data tracks offset from the data track over which a DC-erase waveform 350 or 360 is written to the magnetic-recording disk may span a range of track widths equal to the track width of the data track written with the plurality of pulse-waveforms. In other words, the width of the band of pseudo-data tracks offset from the data track over which a DC-erase waveform 350 or 360 is written may be specified by a range of between plus N and minus N track widths of the data track written with the plurality of pulse-waveforms. In one embodiment of the present invention, the DC-erase waveforms may be written at the track-centers of the plurality of data tracks spanned by this range. For example, the DC-erase waveforms may be written over a range of +3 and −3 track widths, as shown in FIG. 2B, at track centers 224*a*, 224*b* and 224*c* and track centers 224*e*, 224*f* and 224*g*, respectively, above and below the track center 224*d* of the data track 210*d*, which is subsequently written with the plurality of repeating pulse-waveforms.

Figure 4:
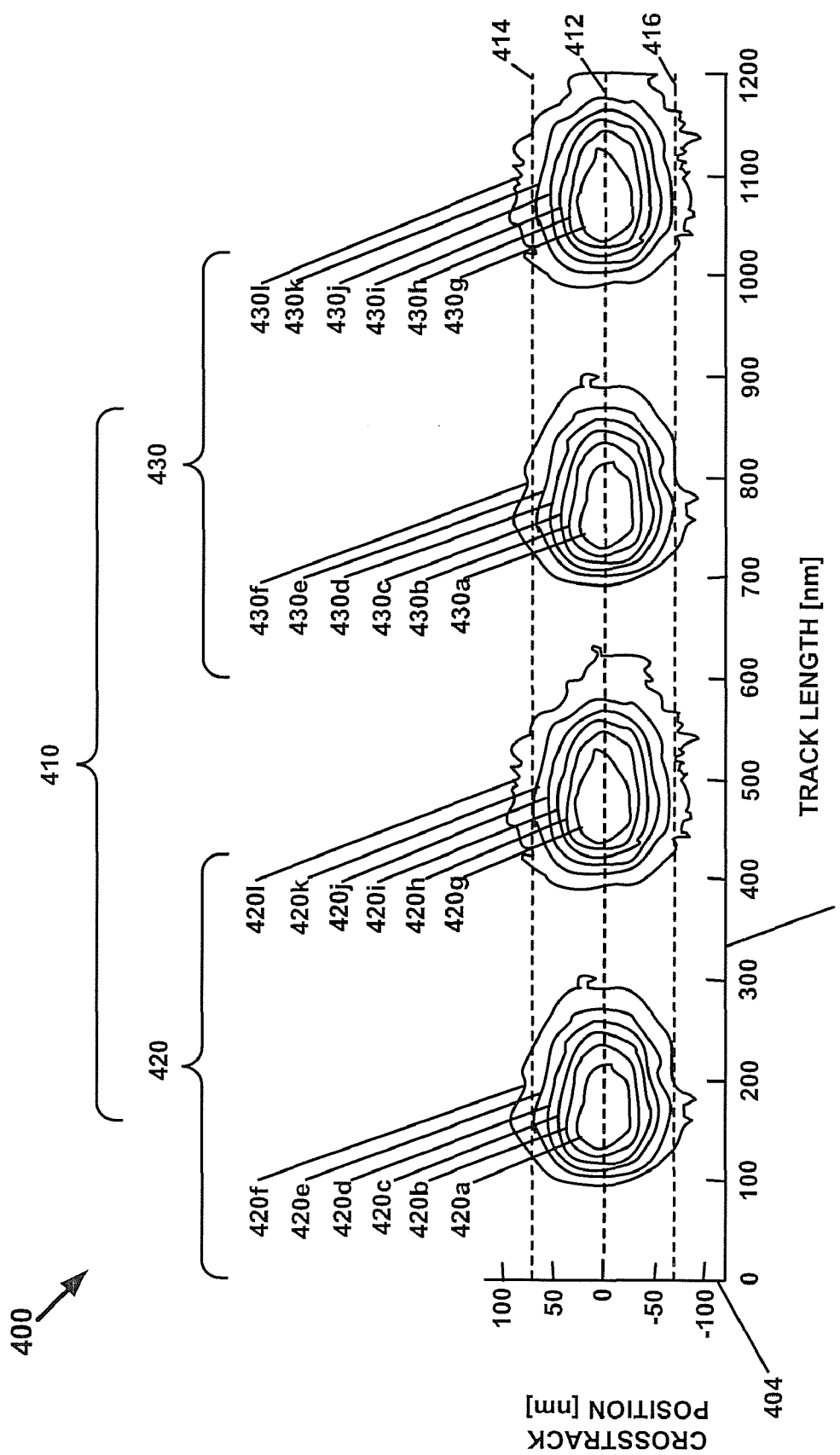
FIG. 4 is a magnetic-recording-signature map synthesized from the read-back signals from the magnetic-recording disk written with the plurality of repeating pulse-waveforms on a data track of a magnetic-recording disk at a write element of a magnetic-recording head illustrating the absence of "hot spots" associated with the presence of ATI and FTI, in an embodiment of the present invention.

With reference now to FIG. 4, in accordance with an embodiment of the present invention, a plot 400 of a magnetic-recording-signature map synthesized from the read-back signals from the magnetic-recording disk of a data track written with a plurality of repeating pulse-waveforms on a data track of a magnetic-recording disk at a write element of a magnetic-recording head is shown. FIG. 4 illustrates the appearance of a magnetic-recording-signature map in the absence of hot spots associated with the presence of ATI and FTI, in other words, the appearance of a magnetic-recording-signature map of a magnetic-recording system in the absence of ATI, or FTI. Ordinate 404 of the plot 400 is given in units of nanometers (nm) of crosstrack position on the magnetic-recording disk 120 of the read element of the magnetic-recording head 110*a* perpendicular to the track-center of the written data track, for example, the track-center 224*d* of data track 210*d*. Abscissa 408 of the plot 400 is given in units of nanometers (nm) of track length of the magnetic-recording disk 120 of the position of read element of the magnetic-recording head 110*a* parallel to the track-center of the written data track. Two "footprints" 420 and 430 of a plurality of repeating pulse-waveforms written on a data track, for example, data track 210*d*, of a magnetic-recording disk 120 are shown. The "footprint," a term of art coined by the inventors, is contour map of the plurality of read-back signals from the magnetic-recording disk 120 over a band of pseudo-data tracks offset from the data track, for example, data track 210*d*, by corresponding pseudo-data-track offsets in a radial direction of the magnetic-recording disk 120 at a read element of the magnetic-recording head 110*a*. Footprint 420 includes a portion corresponding to a positive pulse portion of a first pulse-waveform of the plurality of repeating pulse-waveforms, which includes equi-intensity contours 420*a*, 420*b*, 420*c*, 420*d*, 420*e* and 420*f* of the read-back signals from the magnetic-recording disk 120 read back by the read element of the magnetic-recording head 110*a* that are produced as the read element the magnetic-recording head 110*a* scans the band of pseudo-data tracks offset from the data track, for example, data track 210*d*, by corresponding pseudo-data-track offsets. Similar to a conventional contour map, each of the equi-intensity contours represents a constant level of read-back signal intensity differing from the next adjacent contour by a fixed increment of read-back signal intensity. As shown in FIG. 4, the most positive read-back signal of the footprint 420 corresponding to a positive pulse portion is given by contour 420*a*, and the least positive read-back signal of the footprint 420, by contour 420*f*. Similarly, footprint 420 also includes a portion corresponding to a negative pulse portion of a first pulse-waveform of the plurality of repeating pulse-waveforms, which includes equi-intensity contours 420*g*, 420*h*, 420*i*, 420*j*, 420*k* and 420*l* of the read-back signals from the magnetic-recording disk 120 read back by the read element of the magnetic-recording head 110*a*. As shown in FIG. 4, the most negative read-back signal of the footprint 420 corresponding to a negative pulse portion is given by contour 420*g*, and the least negative read-back signal of the footprint 420, by contour 420*l*.

With further reference to FIG. 4, in accordance with an embodiment of the present invention, footprint 430 includes a portion corresponding to a positive pulse portion of a second pulse-waveform of the plurality of repeating pulse-waveforms, which includes equi-intensity contours 430*a*, 430*b*, 430*c*, 430*d*, 430*e* and 430*f* of the read-back signals from the magnetic-recording disk 120 read back by the read element of the magnetic-recording head 110*a* that are produced as the read element the magnetic-recording head 110*a* scans the band of pseudo-data tracks offset from the data track, for example, data track 210*d*, by corresponding pseudo-data-track offsets. As shown in FIG. 4, the most positive read-back signal of the footprint 430 corresponding to a positive pulse portion is given by contour 430*a*, and the least positive read-back signal of the footprint 430, by contour 430*f*. Similarly, footprint 430 also includes a portion corresponding to a negative pulse portion of a second pulse-waveform of the plurality of repeating pulse-waveforms, which includes equi-intensity contours 430*g*, 430*h*, 430*i*, 430*j*, 430*k* and 430*l* of the read-back signals from the magnetic-recording disk 120 read back by the read element of the magnetic-recording head 110*a*. As shown in FIG. 4, the most negative read-back signal of the footprint 430 corresponding to a negative pulse portion is given by contour 430g, and the least negative read-back signal of the footprint 430, by contour 430l.

With further reference to FIG. 4, in accordance with an embodiment of the present invention, most of the contours of the each of the footprints 420 and 430 are confined within a band between lines 414 and 416 that lie 70 nm on either side either side of a track-center 412 of the data track, for example, corresponding to track-center 224d of data track 210d. The distance between the lines 414 and 416 is the track width of the written data track, for example, similar to track width 220d of the data track 210d, which indicates that the written intensity of the plurality of repeating pulse-waveforms on the data track is well-confined within the track width of the written data track. Thus, the magnetic-recording-signature map shows no evidence of hot spots associated with ATI, or FTI. Moreover, the range of ordinate 404 shows that an outer bound of the band straddling either side of the data track lies outside of 70 nm on either side of the track-center of the data track, which allows display of a magnetic-recording-signature map that straddles a written data track to capture the appearance of hot spots associated with at least ATI. In the case of FTI, in an alternative embodiment of the present invention, the outer bounds of the band straddling either side of the data track would be correspondingly increased to cover plus or minus several track widths either side of the central data track, for example, data track 210d.

Figure 5:
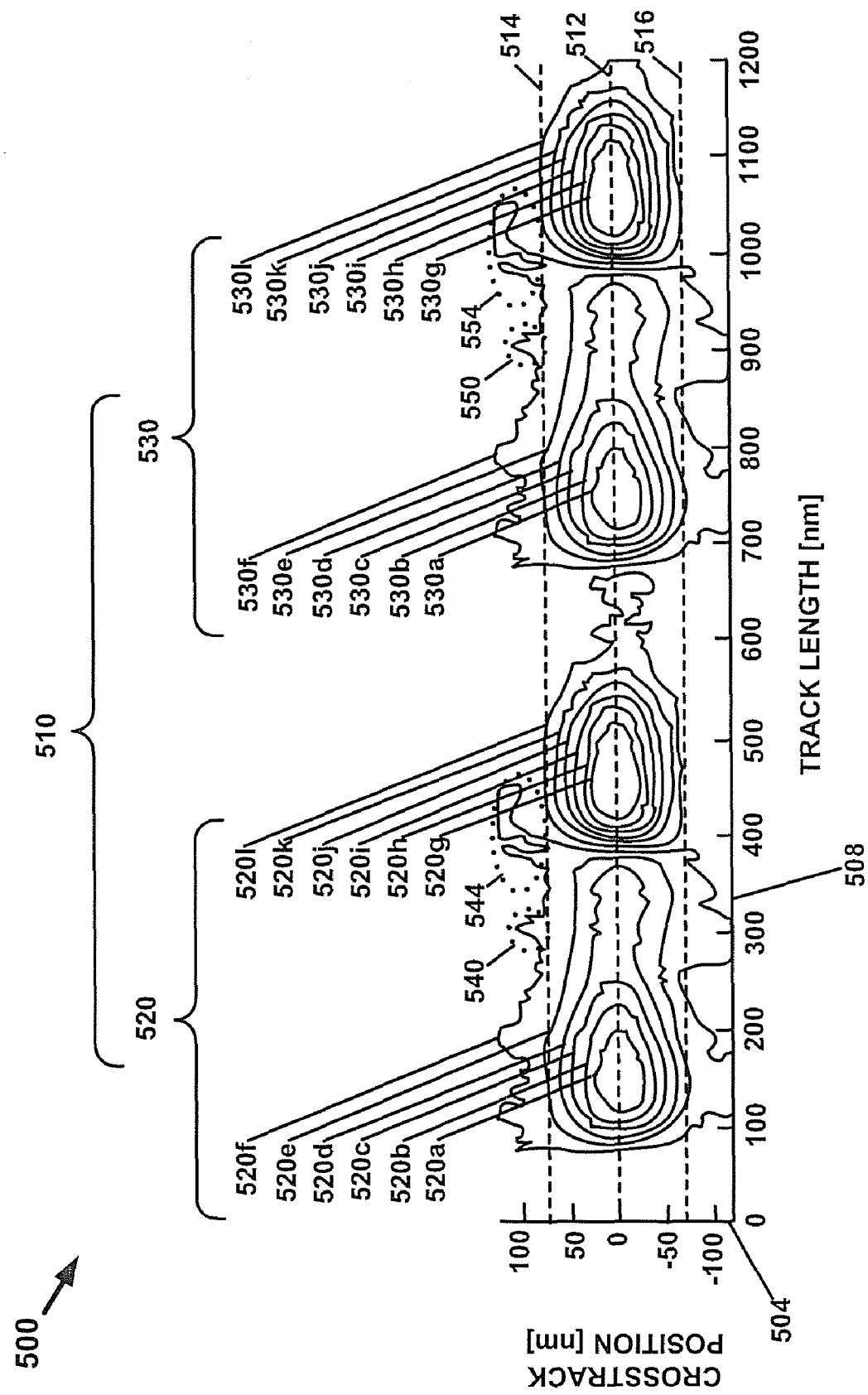
FIG. 5 is a magnetic-recording-signature map synthesized from the read-back signals from the magnetic-recording disk written with the plurality of repeating pulse-waveforms on a data track of a magnetic-recording disk at a write element of a magnetic-recording head illustrating the presence of "hot spots" associated with the presence of ATI and FTI, in an embodiment of the present invention.

With reference now to FIG. 5, in accordance with an embodiment of the present invention, a plot 500 of a magnetic-recording-signature map synthesized from the read-back signals from the magnetic-recording disk written with a plurality of repeating pulse-waveforms on a data track at a write element of a magnetic-recording head is shown. FIG. 5 illustrates the appearance of a magnetic-recording-signature map with the presence of hot spots associated with the presence of ATI and FTI, in other words, the appearance of a magnetic-recording-signature map of a magnetic-recording system that exhibits ATI, or FTI. Ordinate 504 of the plot 500 is given in units of nanometers (nm) of crosstrack position on the magnetic-recording disk 120 of the read element of the magnetic-recording head 110a perpendicular to the track-center of the written data track, for example, the track-center 224d of data track 210d. Abscissa 508 of the plot 500 is given in units of nanometers (nm) of track length of the magnetic-recording disk 120 of the position of the read element of the magnetic-recording head 110a parallel to the track-center of the written data track. Two "footprints" 520 and 530 of a plurality of repeating pulse-waveforms written on a data track, for example, data track 210d, of the magnetic-recording disk 120 are shown. Footprint 520 includes a portion corresponding to a positive pulse portion of a first pulse-waveform of the plurality of repeating pulse-waveforms, which includes equi-intensity contours 520a, 520b, 520c, 520d, 520e and 520f of the read-back signals from the magnetic-recording disk 120 read back by the read element of the magnetic-recording head 110a that are produced as the read element the magnetic-recording head 110a scans the band of pseudo-data tracks offset from the data track, for example, data track 210d, by corresponding pseudo-data-track offsets. Similar to a conventional contour map, each of the equi-intensity contours represents a constant level of read-back signal intensity differing from the next adjacent contour by a fixed increment of read-back signal intensity. As shown in FIG. 5, the most positive read-back signal of the footprint 520 corresponding to a positive pulse portion is given by contour 520a, and the least positive read-back signal of the footprint 520, by contour 520f. Similarly, footprint 520 also includes a portion corresponding to a negative pulse portion of a first pulse-waveform of the plurality of repeating pulse-waveforms, which includes equi-intensity contours 520g, 520h, 520i, 520j, 520k and 520l of the read-back signals from the magnetic-recording disk 120 read back by the read element of the magnetic-recording head 110a. As shown in FIG. 5, the most negative read-back signal of the footprint 520 corresponding to a negative pulse portion is given by contour 520g, and the least negative read-back signal of the footprint 520, by contour 520l.

With further reference to FIG. 5, in accordance with an embodiment of the present invention, footprint 530 includes a portion corresponding to a positive pulse portion of a second pulse-waveform of the plurality of repeating pulse-waveforms, which includes equi-intensity contours 530a, 530b, 530c, 530d, 530e and 530f of the read-back signals from the magnetic-recording disk 120 read back by the read element of the magnetic-recording head 110a that are produced as the read element the magnetic-recording head 110a scans the band of pseudo-data tracks offset from the data track, for example, data track 210d, by corresponding pseudo-data-track offsets. As shown in FIG. 5, the most positive read-back signal of the footprint 530 corresponding to a positive pulse portion is given by contour 530a, and the least positive read-back signal of the footprint 530, by contour 530f. Similarly, footprint 530 also includes a portion corresponding to a negative pulse portion of a second pulse-waveform of the plurality of repeating pulse-waveforms, which includes equi-intensity contours 530g, 530h, 530i, 530j, 530k and 530l of the read-back signals from the magnetic-recording disk 120 read back by the read element of the magnetic-recording head 110a. As shown in FIG. 5, the most negative read-back signal of the footprint 530 corresponding to a negative pulse portion is given by contour 530g, and the least negative read-back signal of the footprint 530, by contour 530l.

With further reference to FIG. 5, in accordance with an embodiment of the present invention, most of the contours of the each of the footprints 520 and 530 are confined within a band between the lines 514 and 516 that lie 70 nm on either side either side of a track-center 512 of the data track. The distance between the lines 514 and 516 is the track width of the written data track, for example, similar to track width 220d of the data track 210d, which indicates that substantial written intensity of the plurality of repeating pulse-waveforms on the data track is well-confined within the track width of the written data track. However, the magnetic-recording-signature map shows anomalous recorded intensity that lies outside of the boundaries set by the lines 514 and 516 that designate the track width of the written data track; anomalous recorded intensity appears at least at locations 540 and 544 on contour 520f of footprint 520 and locations 550 and 554 on contour 530f of footprint 530. These anomalous recorded intensities that are read-back as part of the plurality of read-back signals from the magnetic-recording disk over a band of pseudo-data tracks offset from the data track by corresponding pseudo-data-track offsets in a radial direction of the magnetic-recording disk at a read element of the magnetic-recording head constitute hot spots associated with at least ATI. Moreover, the range of ordinate 504 shows that an outer bound of the band straddling either side of the data track lies outside of 70 nm on either side of the track-center of the data track, which allows display of a magnetic-recording-signature map that straddles a written data track to capture the appearance of hot spots associated with at least ATI. The hot spots may be caused by a number of sources: anomalies in the write element of the magnetic-recording head, anomalies in the magnetic-recording medium of the magnetic-recording disk, or combinations of anomalies in the write element of the magnetic-recording head with anomalies in the magnetic-recording medium of the magnetic-recording disk. Inspecting the magnetic-recording-signature map for such magnetic-recording anomalies, so-called hot spots, allows for screening the HDD for the presence of ATI and FTI based on the appearance of magnetic-recording anomalies selected from the group consisting of magnetic-recording anomalies associated with ATI and magnetic-recording anomalies associated with FTI. To further improve the visibility of such magnetic-recording anomalies displayed in the magnetic-recording-signature map, the method for characterizing a magnetic-recording system for the presence of ATI and FTI may further include: repeating the reading the plurality of read-back signals from the magnetic-recording disk over the band of pseudo-data tracks offset from the data track to produce an iteratively read plurality of read-back signals corresponding to repetition of the reading; signal averaging the iteratively read pluralities of read-back signals to produce a plurality of signal-averaged, read-back signals; and displaying a magnetic-recording-signature map synthesized from the signal-averaged, read-back signals from the magnetic-recording disk. The signal averaging may include summing the plurality of read-back signals produced on one iteration of reading the plurality of read-back signals with subsequent iterations of reading the plurality of read-back signals to produce a summation of the plurality of read-back signals from the one iteration and subsequent iterations. The signal averaging may further include dividing the summation of the plurality of read-back signals by the total number of iterations summed in the summation of the plurality of read-back signals from the one iteration and subsequent iterations. The total number of iterations is one plus the number of subsequent iterations.

Figure 6A:
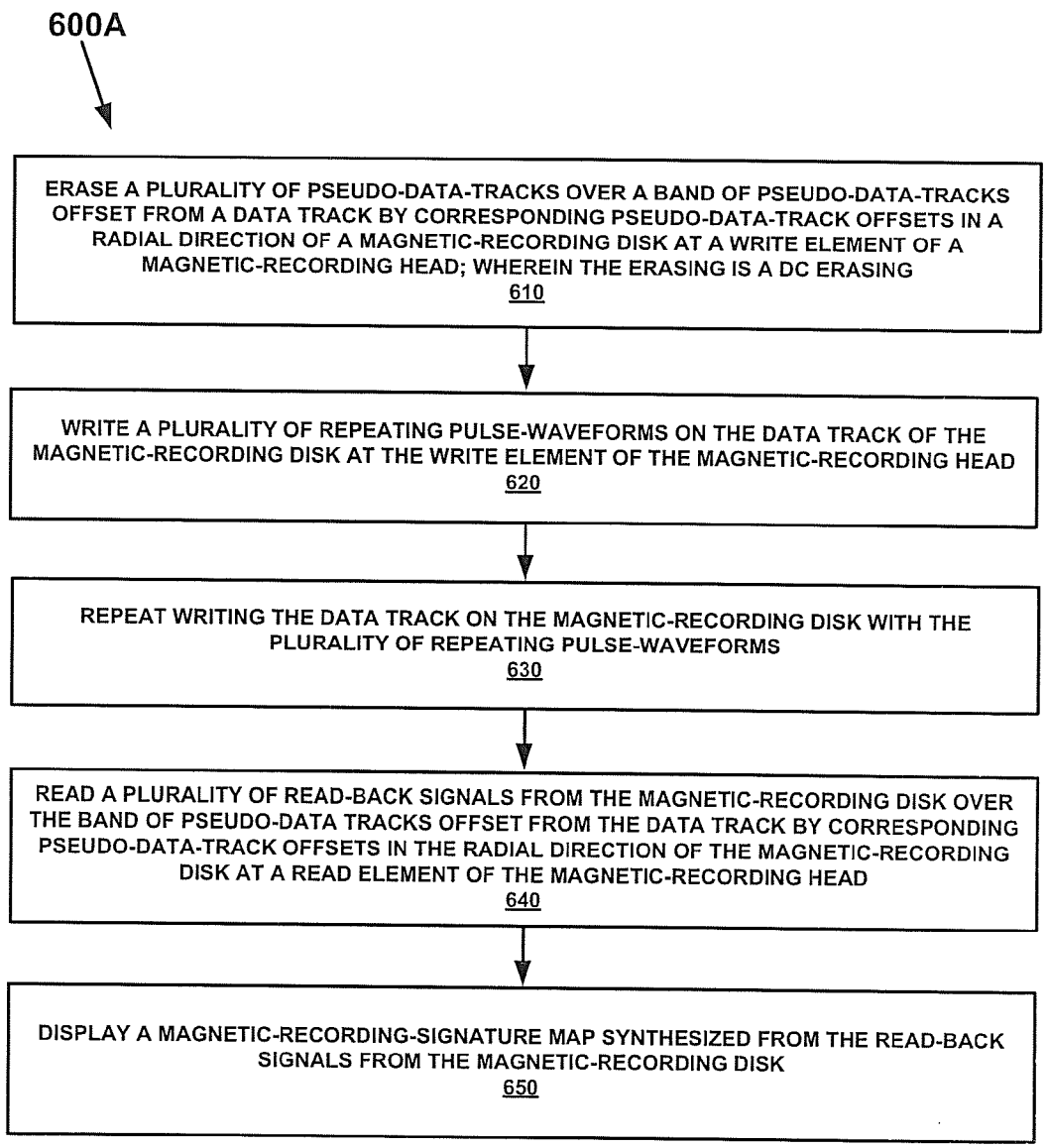
FIG. 6A is flow chart illustrating a method for characterizing a magnetic-recording system for the presence of ATI and FTI, in an embodiment of the present invention.
Figure 6B:
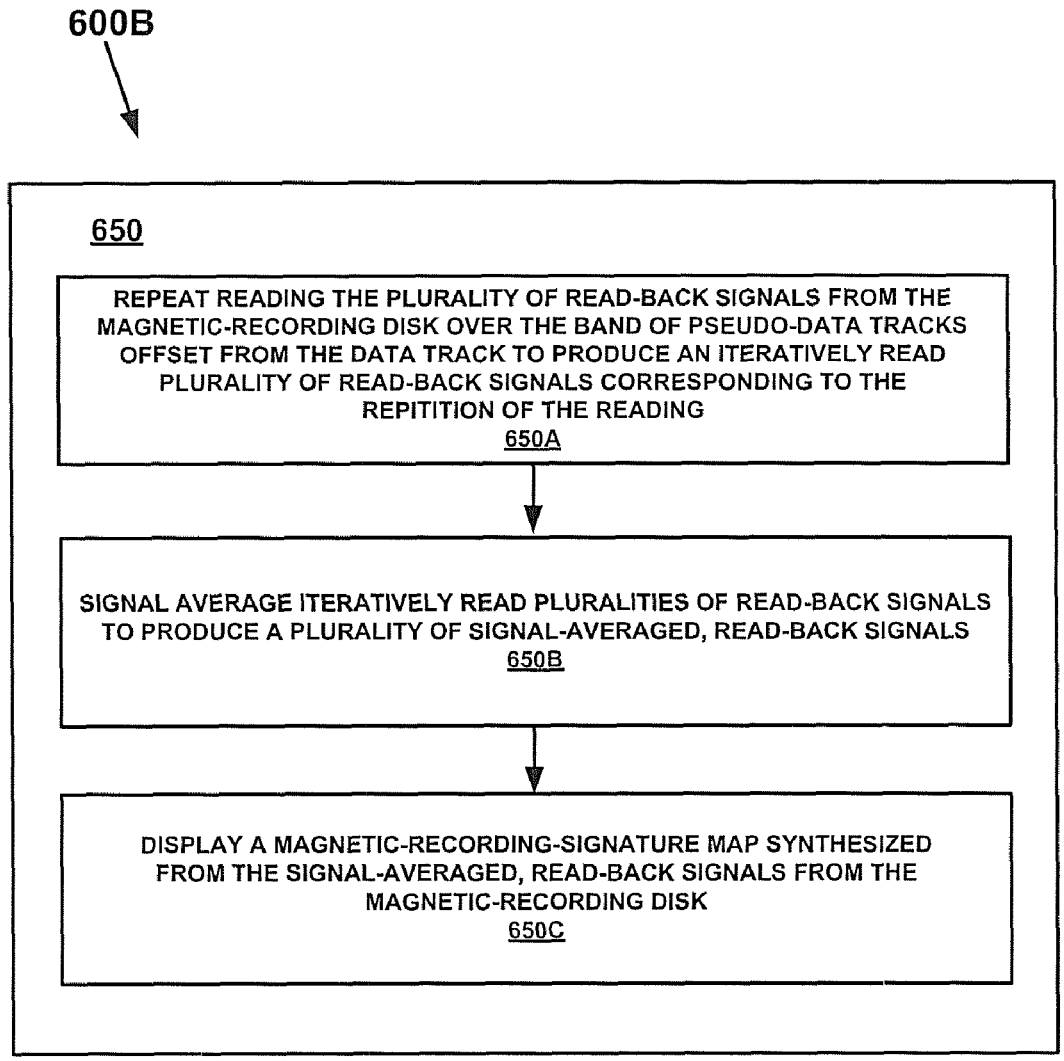
FIG. 6B is flow chart illustrating a further embodiment of the present invention for displaying the magnetic-recording-signature map in the method for characterizing a magnetic-recording system for the presence of ATI and FTI of FIG. 6A, in an embodiment of the present invention.

With reference now to FIGS. 6A and 6B, in accordance with an embodiment of the present invention, flow charts 600A and 600B illustrate the method for characterizing a magnetic-recording system for the presence of ATI and FTI. At 610, a plurality of pseudo-data-tracks over a band of pseudo-data-tracks offset from a data track by corresponding pseudo-data-track offsets in a radial direction of the magnetic-recording disk may be erased at a write element of the magnetic-recording head. The erasure may be by DC erasing. At 620, a plurality of repeating pulse-waveforms in the data track of the magnetic-recording disk is written at the write element of the magnetic-recording head. A pulse-waveform of the plurality of repeating pulse-waveforms includes a positive pulse portion, a positive plateau portion, a negative pulse portion and a negative plateau portion, as previously described in the discussion of FIG. 3A. The plurality of repeating pulse-waveforms has a low-frequency. The low frequency is defined by a distance between portions of the magnetic-recording disk written by pulse portions of the pulse-waveforms being greater than 100 nm, as described above in the discussion of FIG. 3A. The positive plateau portion of the pulse-waveform may be set at a level below a level sufficient to write the magnetic-recording disk. Similarly, the negative plateau portion of a pulse-waveform may be set at a level above a level sufficient to write the magnetic-recording disk. In addition, an outer bound of the band straddling either side of the data track lies outside of 70 nm on either side of the track-center of the data track. At 630, writing the track on the magnetic-recording disk with the plurality of repeating pulse-waveforms is repeated. The number of repetitions for writing the data track and magnetic-recording disk with the plurality of repeating pulse-waveforms may be in the range of 1000 to 10 million times. The visualization of the hot spots improves with the number of repetitions. However, a point of diminishing returns is reached at which a marginal improvement in visibility of a hot spot provided by further repetitions of writing the data track of the magnetic-recording disk with the plurality of repeating pulse-waveforms is not worth the cost associated with the increased amount of time associated with the further repetitions. 100,000 repetitions provides a good compromise between visualization and a reasonable amount of time to produce a magnetic-recording-signature map of a hot spot associated with ATI, or FTI. At 640, a plurality of read-back signals from the magnetic-recording disk over a band of pseudo-data-tracks offset from the data track by corresponding pseudo-data-track offsets in a radial direction of the magnetic-recording disk are read at a read element of the magnetic-recording head. At 650, a magnetic-recording-signature map that is synthesized from the read-back signals from the magnetic-recording disk is displayed.

With reference to FIG. 6B, in accordance with an embodiment of the present invention, flow chart 600B illustrates a further embodiment of the present invention for the displaying 650 the magnetic-recording-signature map in a method for characterizing a magnetic-recording system for the presence of ATI and FTI. At 650A, reading the plurality of read-back signals from the magnetic-recording disk over the band of pseudo-data tracks offset from the data track is repeated to produce an iteratively read plurality of read-back signals corresponding to the repetition of the reading. At 650B, the iteratively read pluralities of read-back signals are signal averaged to produce a plurality of signal averaged, read-back signals. At 650C, a magnetic-recording-signature map that is synthesized from the signal-averaged, read-back signals from the magnetic-recording disk is displayed.

Figure 7:
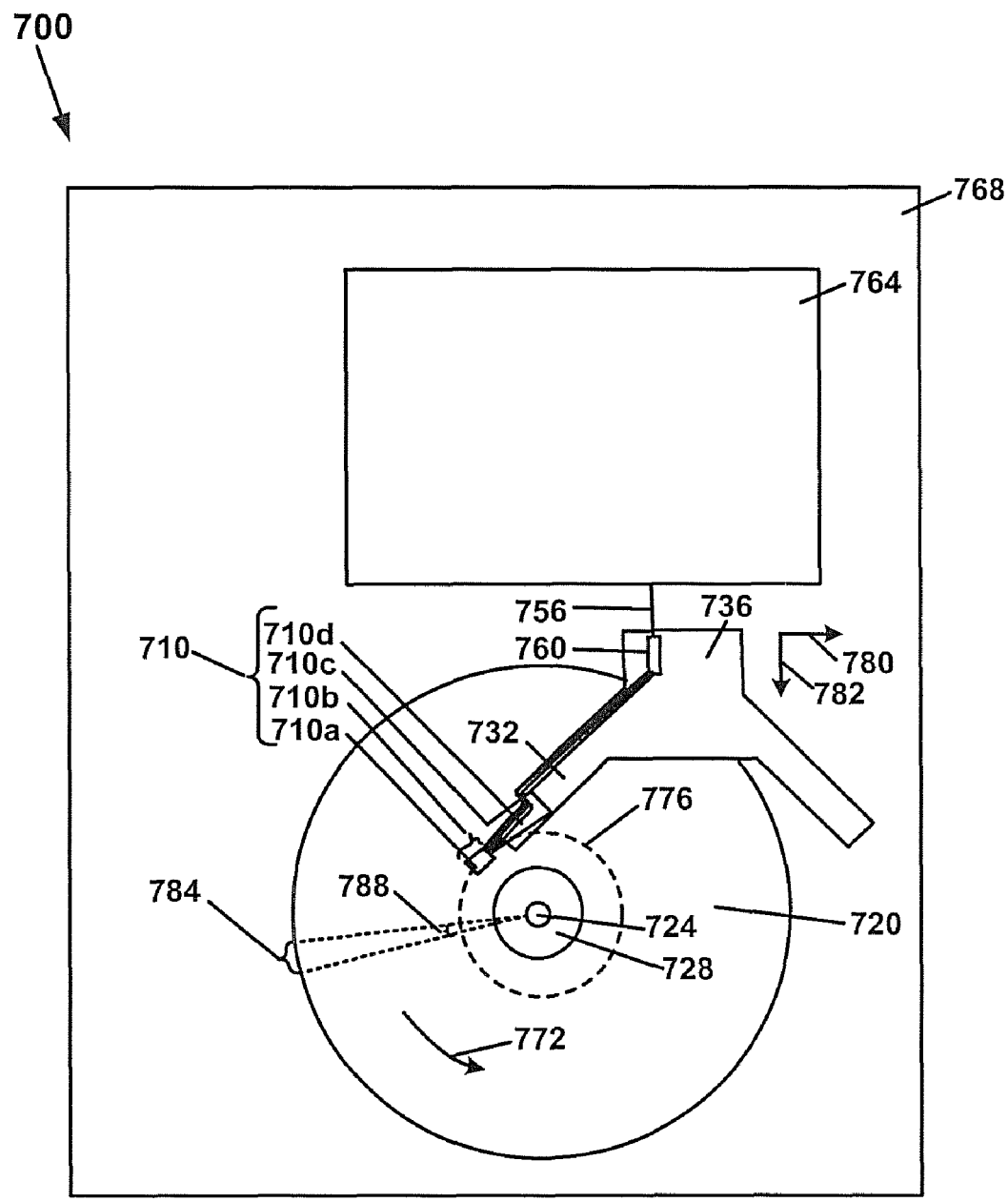
FIG. 7 is plan view of an alternative example magnetic-recording system, for example, a spinstand, illustrating an example environment in which a method for characterizing the magnetic-recording system for the presence of ATI and FTI may be practiced utilizing a spinstand, in an embodiment of the present invention.

Description of Embodiments of the Present Invention for a Method for Characterizing a Magnetic-Recording System for the Presence of Adjacent-Track Interference and Far-Track Interference Utilizing a Spinstand With reference now to FIG. 7, in accordance with an embodiment of the present invention, a plan view of an alternative example magnetic-recording system, for example, a spinstand 700, is shown. FIG. 7 illustrates an example environment in which a method for characterizing the magnetic-recording system for the presence of ATI and FTI may be practiced utilizing the spinstand 700. The method for characterizing a magnetic-recording system for the presence of ATI and FTI utilizing the spinstand 700 next described is similar to the method for characterizing a magnetic-recording system for the presence of ATI and FTI described above in the discussions of FIGS. 1, 2A, 2B, 3A, 3B, 4, 5, 6A and 6B, except that the method is practiced in the environment of the spinstand 700. Therefore, embodiments of the present invention described above in the discussions of FIGS. 1, 2A, 2B, 3A, 3B, 4, 5, 6A and 6B applicable in the environment of the spinstand 700 are incorporated herein.

With further reference to FIG. 7, in accordance with an embodiment of the present invention for the method for characterizing the magnetic-recording system for the presence of ATI and FTI utilizing the spinstand 700, a spinstand 700 is provided. The spinstand 700 is configured to write a plurality of repeating pulse-waveforms, for example, plurality 310 of repeating pulse-waveforms 320, 330 and 340, on a data track portion of the track 776 of a magnetic-recording disk 720 mounted on spindle 724 of the spinstand 700 at a write element of a magnetic-recording head 710*a* within a slider 710*b* coupled to an arm 732 of the spinstand 700. The spinstand 700 is also configured to read a plurality of read-back signals from the magnetic-recording disk 720 over a band of pseudo-data tracks offset from the data track portion of the track 776 by corresponding pseudo-data-track offsets in a radial direction of the magnetic-recording disk 720 at a read element of the magnetic-recording head 710a within a slider coupled to an arm of the spinstand 700. Alternatively, characterizing the magnetic-recording system for the presence of ATI and FTI may be performed on the magnetic-recording head 710a suspended on a manufactured HGA, for example, HGA 710. The HGA 710 including the magnetic-recording head 710a is coupled to the arm 732 of a head loader 736 of the spinstand 700. The HGA 710 includes the magnetic-recording head 710a, a lead suspension 710c attached to the magnetic-recording head 710a, and a load beam 710d attached to the slider 710b, which includes the magnetic-recording head 710a at a distal end of the slider 710b; the slider 710b is attached at the distal end of the load beam 710d to a gimbal portion of the load beam 710d. The spinstand 700 also includes the magnetic-recording disk 720 rotatably mounted on the spindle 724 and a drive motor (not shown) attached to the spindle 724 for rotating the magnetic-recording disk 720. The magnetic-recording head 710a includes a write element, a so-called writer, and a read element, a so-called reader, for respectively writing and reading information stored on the magnetic-recording disk 720 of the spinstand 700. The magnetic-recording disk 720 may be affixed to the spindle 724 with a disk clamp 728. The head loader 736 of the spinstand 700 is configured to move the attached HGA 710 to access portions of the magnetic-recording disk 720.

With further reference to FIG. 7, in accordance with an embodiment of the present invention, electrical signals, for example, a write signal to and a read signal from the magnetic-recording head 710a, are provided by a flexible cable 756. Interconnection between the flexible cable 756 and the magnetic-recording head 710a may be provided by an AE module 760, which may have an on-board pre-amplifier for the read signal, as well as other read-channel and write-channel electronic components. The flexible cable 756 is coupled to a support electronics module 764, which provides electrical test signals to the magnetic-recording head 710a and control signals form the magnetic-recording head 710a, for example, PESs that are used in testing the magnetic-recording system, which includes the magnetic-recording head 710a and the magnetic-recording disk 720. A vibration-damping table 768, for example, a granite block, provides a base for the components of the spinstand 700 that minimizes spurious vibrations that might interfere with characterizing the magnetic-recording system for the presence of ATI and FTI.

With further reference to FIG. 7, in accordance with an embodiment of the present invention, the support electronics module 764, including as a disk controller and servo electronics, provides electrical signals to the drive motor, the stepper motors, or linear actuators, attached to the head loader 736 and the magnetic-recording head 710a of the HGA 710. The electrical signal provided to the drive motor enables the drive motor to spin providing a torque to the spindle 724 which is in turn transmitted to the magnetic-recording disk 720 that is affixed to the spindle 724 by the disk clamp 728; as a result, the magnetic-recording disk 720 spins in a direction 772. The spinning magnetic-recording disk 720 creates a cushion of air that acts as an air bearing on which the ABS of the slider 710b rides so that the slider 710b flies above the surface of the magnetic-recording disk 720 without making contact with a thin magnetic-recording medium of the magnetic-recording disk 720 in which information is recorded. The electrical signal provided to the stepper motors, or linear actuators, attached to the head loader 736 enables the magnetic-recording head 710a of the HGA 710 to access the track 776 on which information is recorded. Thus, the head loader 736 moves along an x-direction 780 and a y-direction 782 which enables the HGA 710 attached to the head loader 736 to access various tracks on the magnetic-recording disk 720. Information is recorded on the magnetic-recording disk 720 in a plurality of concentric tracks (not shown) arranged in sectors on the top of the magnetic-recording disk 720, for example, sector 784. Correspondingly, each track is composed of a plurality of sectored track portions, for example, sectored track portion 788. Each sectored track portion 788 may be composed of recorded test data, for example, a plurality of repeating pulse-waveforms, similar to the plurality 310 of repeating pulse-waveforms 320, 330 and 340, and a header containing a servo-burst-signal pattern, for example, an ABCD-servo-burst-signal pattern. In accessing the track 776, the read element of the magnetic-recording head 710a of the HGA 710 reads the ABCD-servo-burst-signal pattern which provides information to the servo electronics, which controls the electrical signal provided to the stepper motors, or linear actuators, attached to the head loader 736, enabling the magnetic-recording head 710a to follow the track 776. Upon finding the track 776 and identifying a particular sectored track portion 788, the magnetic-recording head 710a either reads data from the track 776 or writes data to the track 776 depending on instructions received by the disk controller from an external agent, for example, a microprocessor of a computer system interfaced to the spinstand 700.

With reference once again to FIG. 2A and further reference to FIG. 7, in accordance with an embodiment of the present invention, a plan view of a portion of a track 200A including a data track 210d and an ABCD-servo-burst-signal pattern 230d is shown. FIG. 2A illustrates the motion of the head across the track 200A for characterizing a magnetic-recording system, for example, HDD 100, for the presence of ATI and FTI. First, the data track 210d is written with the write-element of the magnetic-recording head 710a; the head is parked at a particular radial location on the magnetic-recording disk 720 by the head loader 736 at the center of track 200A, given by track-center 224d, and the data track 210d is written on the magnetic-recording disk 720 corresponding to the track 776 shown in FIG. 7. Second, the stepper motors, or linear actuators, attached to the head loader 736 may be moved incrementally along the x-direction 780 and the y-direction 782 simultaneously so that the magnetic-recording head 710a moves along a radial direction of the magnetic-recording disk 720 along a path, for example, similar to the path indicated by arrow 240 perpendicular to the data track 210d of FIGS. 2A and 2B. The path, similar to the path indicated by arrow 240, may be broken up into a plurality of equal incremental steps starting at a position at least about one track width from a track-edge, for example, similar to track width 220d from the track-edge 218d or 214d, and ending at a position defined by an outer bound of a band straddling either side of the data track greater than about 70 nm on either side of the track-center of the data track, for example, similar to track-center 224d of the data track 210d. As the magnetic-recording head 710a is moved along the path, similar to the path indicated by arrow 240, the amplitude of the output from the read-element of the magnetic-recording head 710a is read and may be plotted as a function of position given by the offset from the track-center and position along the track length of the data track to provide read-back signals for displaying a magnetic-recording-signature map synthesized from the read-back signals from the magnetic-recording disk 720. The magnetic-recording-signature maps herein described above in FIGS. 5 and 6 may be obtained using a spinstand 700 manufactured by Guzik.

Figure 8A:
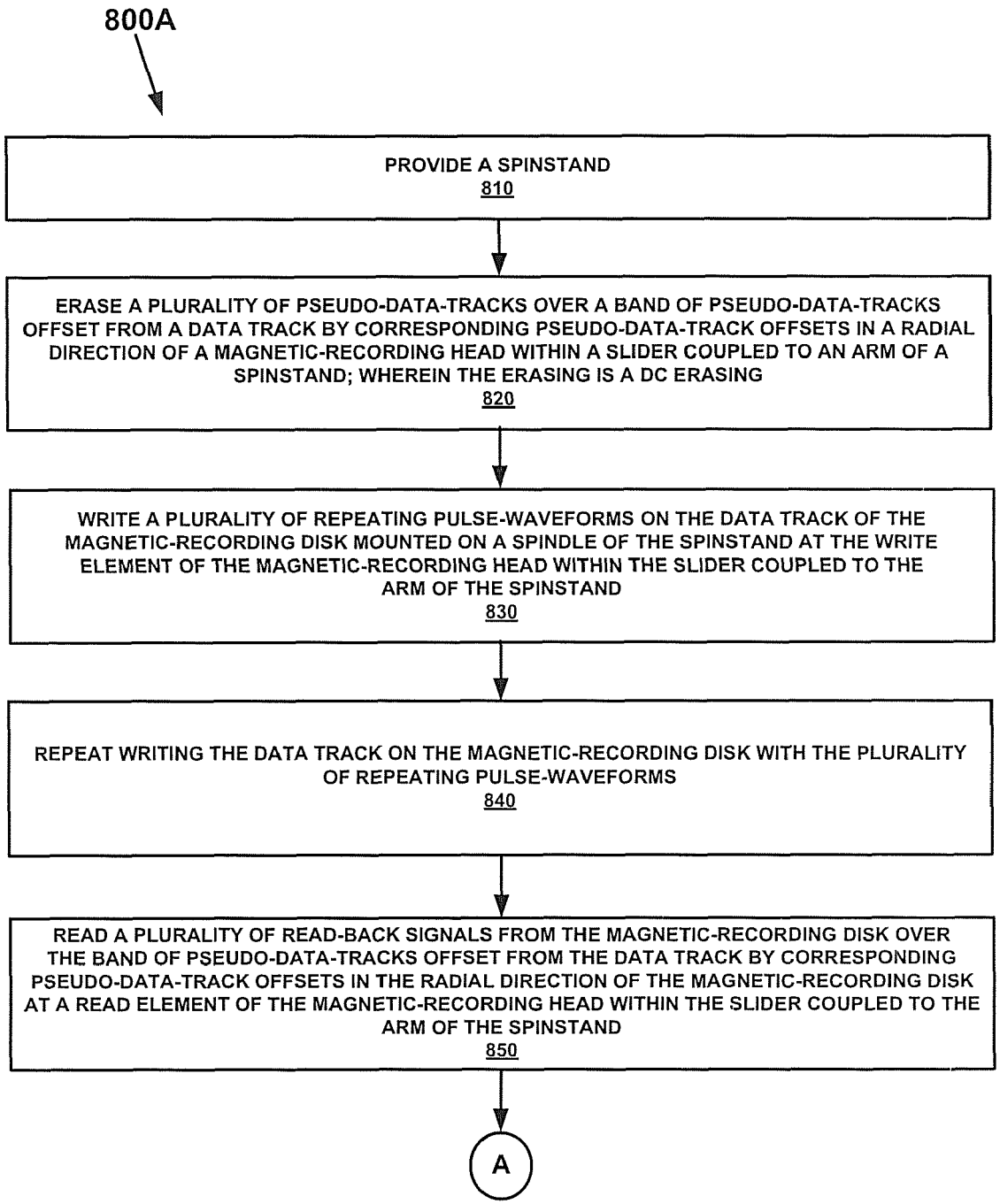
FIG. 8A is flow chart illustrating the method for characterizing the magnetic-recording system for the presence of ATI and FTI utilizing the spinstand of FIG. 7, in an embodiment of the present invention.
Figure 8B:
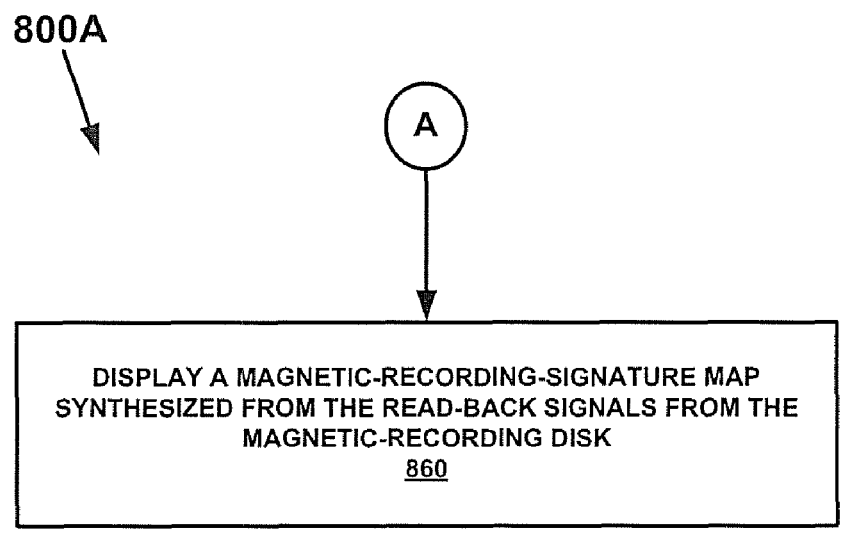
FIG. 8B is a continuation of the flow chart of FIG. 8A illustrating the method for characterizing the magnetic-recording system for the presence of ATI and FTI utilizing the spinstand of FIG. 7, in an embodiment of the present invention.
Figure 8C:
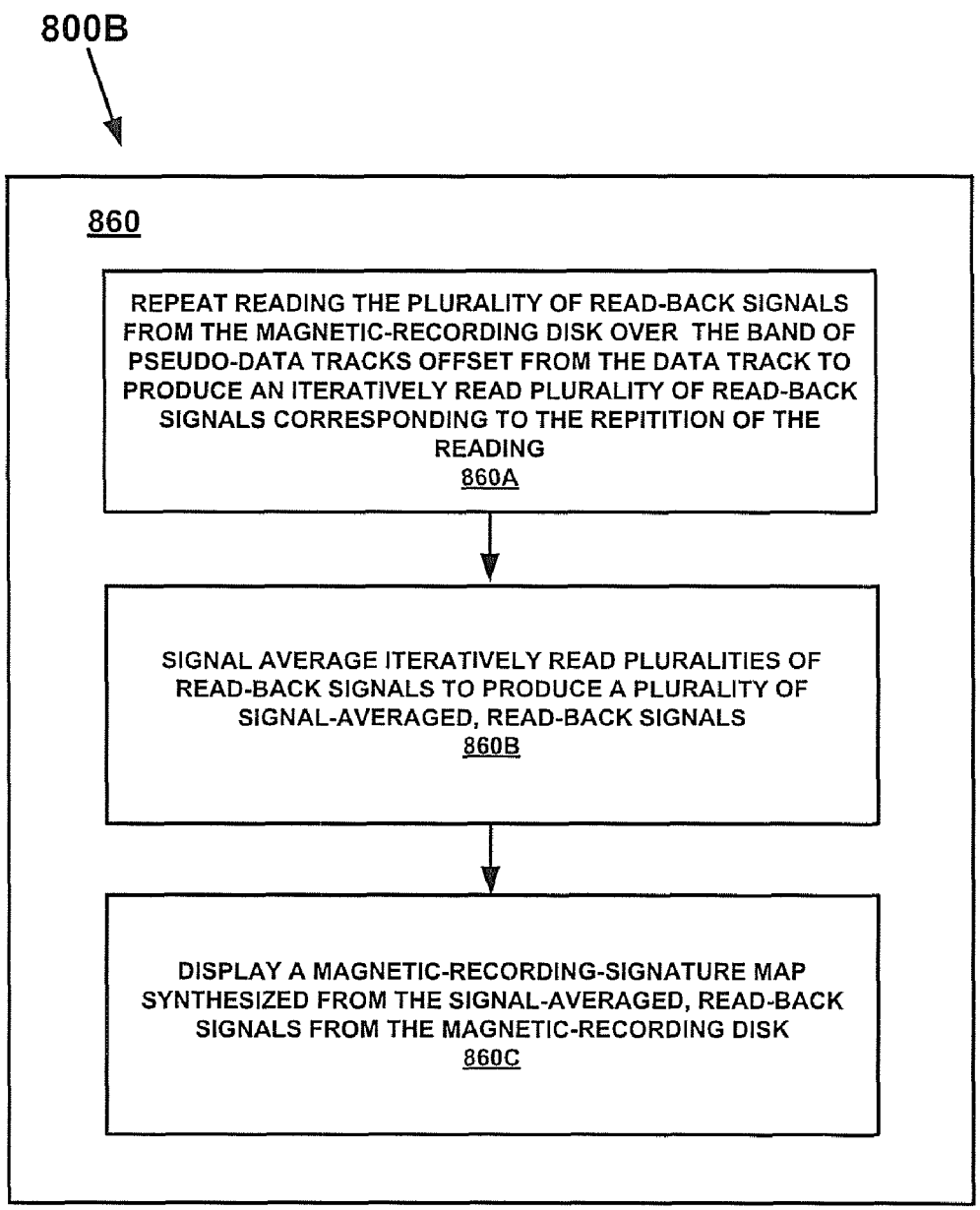
FIG. 8C is flow chart illustrating a further embodiment of the present invention for displaying the magnetic-recording-signature map in the method for characterizing the magnetic-recording system for the presence of ATI and FTI utilizing the spinstand of FIG. 7, in an embodiment of the present invention.

With reference now to FIGS. 8A, 8B and 8C, in accordance with an embodiment of the present invention, flow charts 800A and 800B illustrate the method for characterizing a magnetic-recording system for the presence of ATI and FTI utilizing a spinstand. At 810, a spinstand is provided. At 820, a plurality of pseudo-data-tracks over a band of pseudo-data tracks offset from a data track by corresponding pseudo-data-track offsets in a radial direction of the magnetic-recording disk may be erased at a write element of the magnetic-recording head within a slider coupled to an arm of the spinstand. The erasure may be by DC erasing, as described above in the discussion of FIG. 3B. At 830, a plurality of repeating pulse-waveforms in the data track of the magnetic-recording disk is written at the write element of the magnetic-recording head within a slider coupled to an arm of the spinstand. A pulse-waveform of the plurality of repeating pulse-waveforms includes a positive pulse portion, a positive plateau portion, a negative pulse portion and a negative plateau portion, as previously described in the discussion of FIG. 3A. The plurality of repeating pulse-waveforms has a low-frequency. The low frequency is defined by a distance between portions of the magnetic-recording disk written by pulse portions of the pulse-waveforms being greater than 100 nm, as described above in the discussion of FIG. 3A. The positive plateau portion of the pulse-waveform may be set at a level below a level sufficient to write the magnetic-recording disk. Similarly, the negative plateau portion of a pulse-waveform may be set at a level above a level sufficient to write the magnetic-recording disk. In addition, an outer bound of the band straddling either side of the data track lies outside of 70 nm on either side of the track-center of the data track. At 840, writing the data track on the magnetic-recording disk with the plurality of repeating pulse-waveforms may be repeated. At 850, a plurality of read-back signals from the magnetic-recording disk over a band of pseudo-data-tracks offset from the data track by corresponding pseudo-data-track offsets in a radial direction of the magnetic-recording disk are read at a read element of the magnetic-recording head within a slider coupled to an arm of the spinstand. At 860, a magnetic-recording-signature map that is synthesized from the read-back signals from the magnetic-recording disk is displayed.

With reference now to FIG. 8C, in accordance with an embodiment of the present invention, flow chart 800B illustrates a further embodiment of the present invention for the displaying 860 the magnetic-recording-signature map in a method for characterizing a magnetic-recording system for the presence of ATI and FTI utilizing a spinstand. At 860A, reading the plurality of read-back signals from the magnetic-recording disk over the band of pseudo-data tracks offset from the data track is repeated to produce an iteratively read plurality of read-back signals corresponding to the repetition of the reading. At 860B, the iteratively read pluralities of read-back signals are signal averaged to produce a plurality of signal averaged, read-back signals. At 860C, a magnetic-recording-signature map that is synthesized from the signal-averaged, read-back signals from the magnetic-recording disk is displayed.

Figure 9:
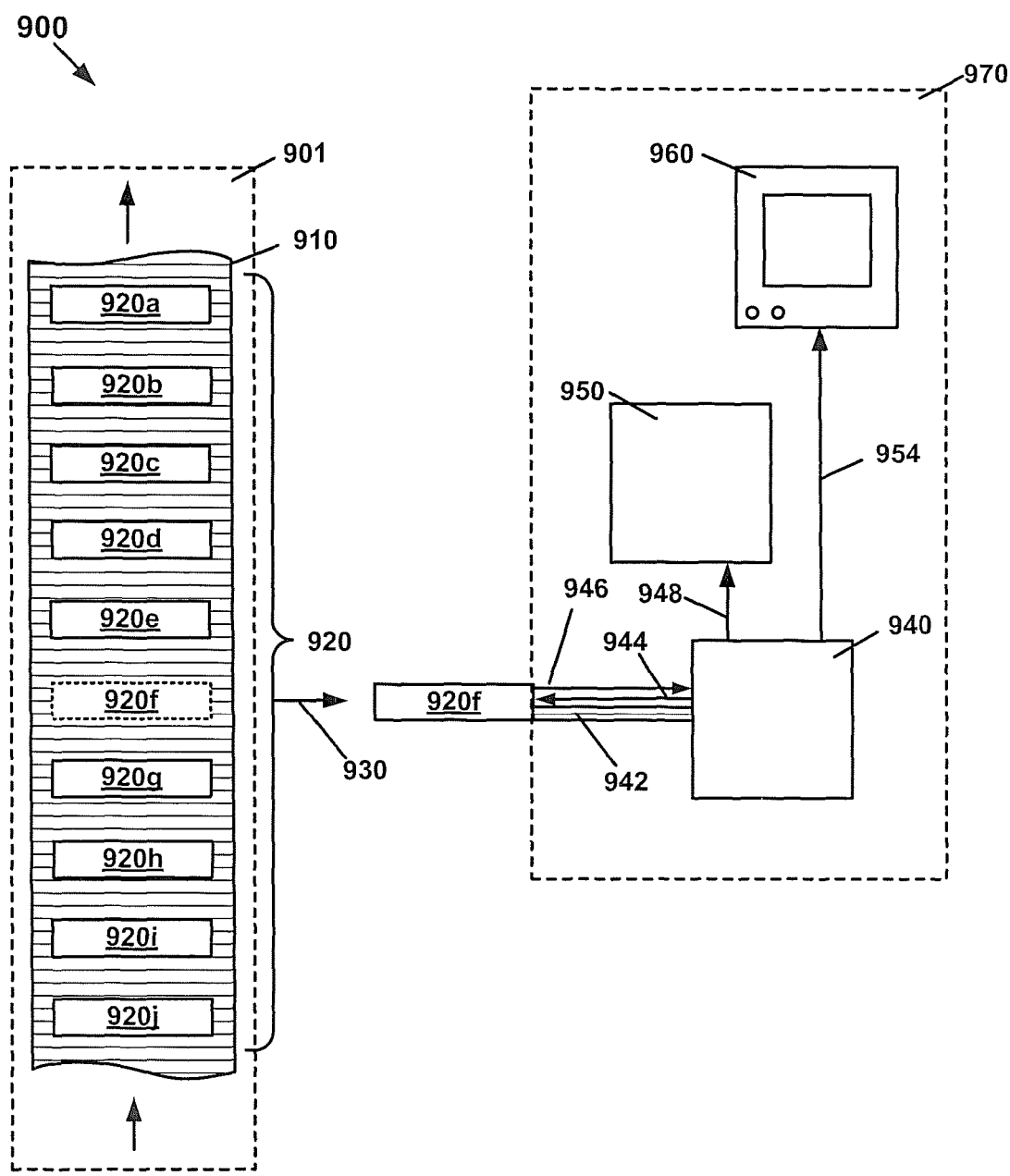
FIG. 9 is a schematic diagram of an alternative environment, for example, a manufacturing process, in which to characterize the HDD for the presence of ATI and FTI, in an embodiment of the present invention.

Description of Embodiments of the Present Invention for a Method for Manufacturing a Hard-Disk Drive by Characterizing the Hard-Disk Drive for the Presence of Adjacent-Track Interference and Far-Track Interference With reference now to FIG. 9, in accordance with an embodiment of the present invention, a schematic diagram 900 of an alternative environment, for example, a manufacturing process, in which to characterize a HDD 920f for the presence of ATI and FTI, is shown. FIG. 9 shows a manufacturing line 901 in which a plurality 920 of HDDs 920a, 920b, 920c, 920d, 920e, 920f, 920g, 920h, 920i and 920j are being processed in a manufacturing process. The manufacturing process includes a method for manufacturing a HDD by characterizing the HDD for the presence of ATI and FTI. The method for manufacturing a HDD by characterizing the HDD for the presence of ATI and FTI next described is similar to the method for characterizing a magnetic-recording system for the presence of ATI and FTI described above in the discussions of FIGS. 1, 2A, 2B, 3A, 3B, 4, 5, 6A and 6B, except that the method is practiced in the environment of the manufacturing process. Therefore, embodiments of the present invention described above in the discussions of FIGS. 1, 2A, 2B, 3A, 3B, 4, 5, 6A and 6B applicable in the environment of the manufacturing process are incorporated herein.

With further reference to FIG. 9, in accordance with an embodiment of the present invention for the method for manufacturing a HDD by characterizing the HDD for the presence of ATI and FTI, a HDD 920f is selected for testing at a HDD tester 940 by removal 930 from the manufacturing line 901, for example, by removal from a conveyor belt 910, without limitation thereto. The selection of an HDD for characterization may include the random sampling of every tenth HDD as shown in FIG. 9, without limitation thereto, as a size of a population that is sampled is within the discretion of an analyst, being within the spirit and scope of embodiments of the present invention. Alternatively, every hundredth HDD might be sampled for characterization. The HDD tester 940 is connected to the HDD 920f, for example, with a ribbon cable 942, without limitation thereto, to receive instructions 944 from the HDD tester 940. In response to instructions 944 sent by the HDD tester 940, a plurality of repeating pulse-waveforms, for example, plurality 310 of repeating pulse-waveforms 320, 330 and 340, is written on a data track of a magnetic-recording disk, for example, similar to data track 210d of the magnetic-recording disk 120, of the HDD 920f at a write element of a magnetic-recording head, for example, similar to magnetic-recording head 110a. In response to instructions sent 944 by the HDD tester 940 a plurality of read-back signals from the magnetic-recording disk over a band of pseudo-data tracks offset is read from the data track by corresponding pseudo-data-track offsets in a radial direction of the magnetic-recording disk at a read element of the magnetic-recording head. As indicated by arrow 946, the plurality of read-back signals from the magnetic-recording disk is sent to the HDD tester 940 from the HDD 920f. As indicated by arrow 948, the read-back signals from the magnetic-recording disk of HDD 920f are stored in a computer memory 950 being sent by the HDD tester 940. As indicated by arrow 954, a magnetic-recording-signature map synthesized from the read-back signals from the magnetic-recording disk by the HDD tester 940, or another computer, may be displayed on a monitor 958, output to a peripheral device such as a printer or plotter, or sent via a communications network, for example, such as a local area network (LAN) or wide area network (WAN), without limitation thereto, to a remote terminal or computer station. As shown in FIG. 9, for one embodiment of the present invention, a computer 970 may include the HDD tester 940, the computer memory 950 and the monitor 960.

With further reference to FIG. 9, in accordance with an embodiment of the present invention, the method for manufacturing a HDD by characterizing the HDD for the presence of ATI and FTI may further include inspecting the magnetic-recording-signature map for magnetic-recording anomalies, so-called hot spots, which allows for screening the HDD for the presence of ATI and FTI based on the appearance of magnetic-recording anomalies selected from the group consisting of magnetic-recording anomalies associated with ATI and magnetic-recording anomalies associated with FTI. To further improve the visibility of such magnetic-recording anomalies displayed in the magnetic-recording-signature map, the method for characterizing a magnetic-recording system for the presence of ATI and FTI may further include: repeating the reading the plurality of read-back signals from the magnetic-recording disk over the band of pseudo-data tracks offset from the data track to produce an iteratively read plurality of read-back signals corresponding to repetition of the reading; signal averaging the iteratively read pluralities of read-back signals to produce a plurality of signal-averaged, read-back signals; and displaying a magnetic-recording-signature map synthesized from the signal-averaged, read-back signals from the magnetic-recording disk. The signal averaging may include summing the plurality of read-back signals produced on one iteration of reading the plurality of read-back signals with subsequent iterations of reading the plurality of read-back signals to produce a summation of the plurality of read-back signals from the one iteration and subsequent iterations. The signal averaging may further include dividing the summation of the plurality of read-back signals by the total number of iterations summed in the summation of the plurality of read-back signals from the one iteration and subsequent iterations. The total number of iterations is one plus the number of subsequent iterations.

With further reference to FIG. 9, in accordance with an embodiment of the present invention, as for a mode of implementation of embodiments of the present invention as instructions of a computer system, these instructions may be located in various modules of a computer system, or even distributed amongst various modules of a computer system configured to execute those instructions, as is well known from the computer art. Nevertheless, the embodiment of the present invention shown in FIG. 9 provides a convenient schematic representation. It should be recognized that the schematic representation shown in FIG. 9 does not preclude embodiments of the present invention in hardware, firmware, hardware and software, firmware and software, or hardware and firmware and software. Moreover, embodiments of the present invention may be implemented as machine-readable instructions in machine-readable code on a machine-readable storage medium such as: a hard disk, floppy disk, optical storage disk, CD-ROM, RAM or ROM.

Figure 10A:
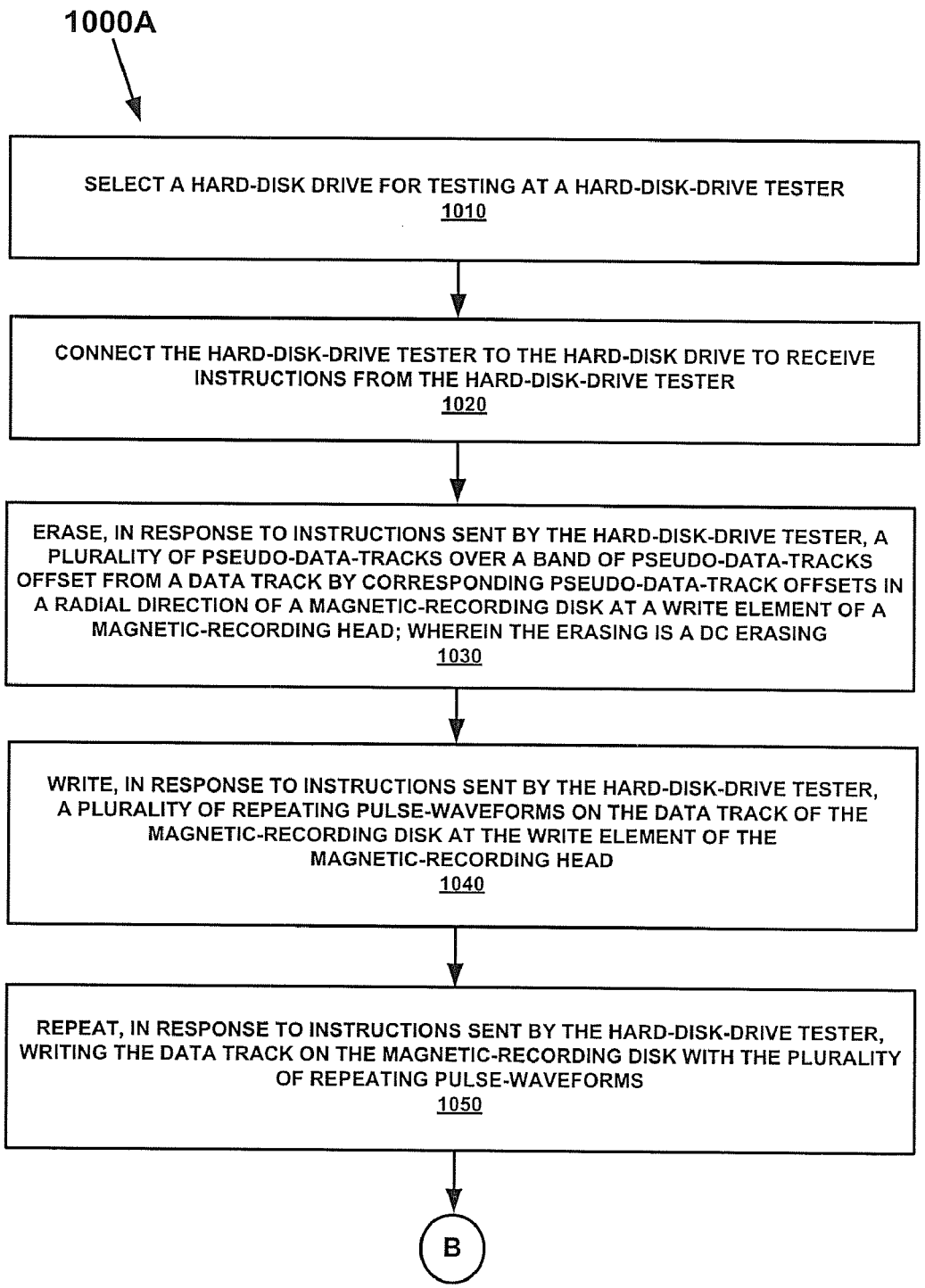
FIG. 10A is flow chart illustrating the method for manufacturing the HDD by characterizing the HDD for the presence of ATI and FTI in the environment of the manufacturing process of FIG. 9, in an embodiment of the present invention.
Figure 10B:
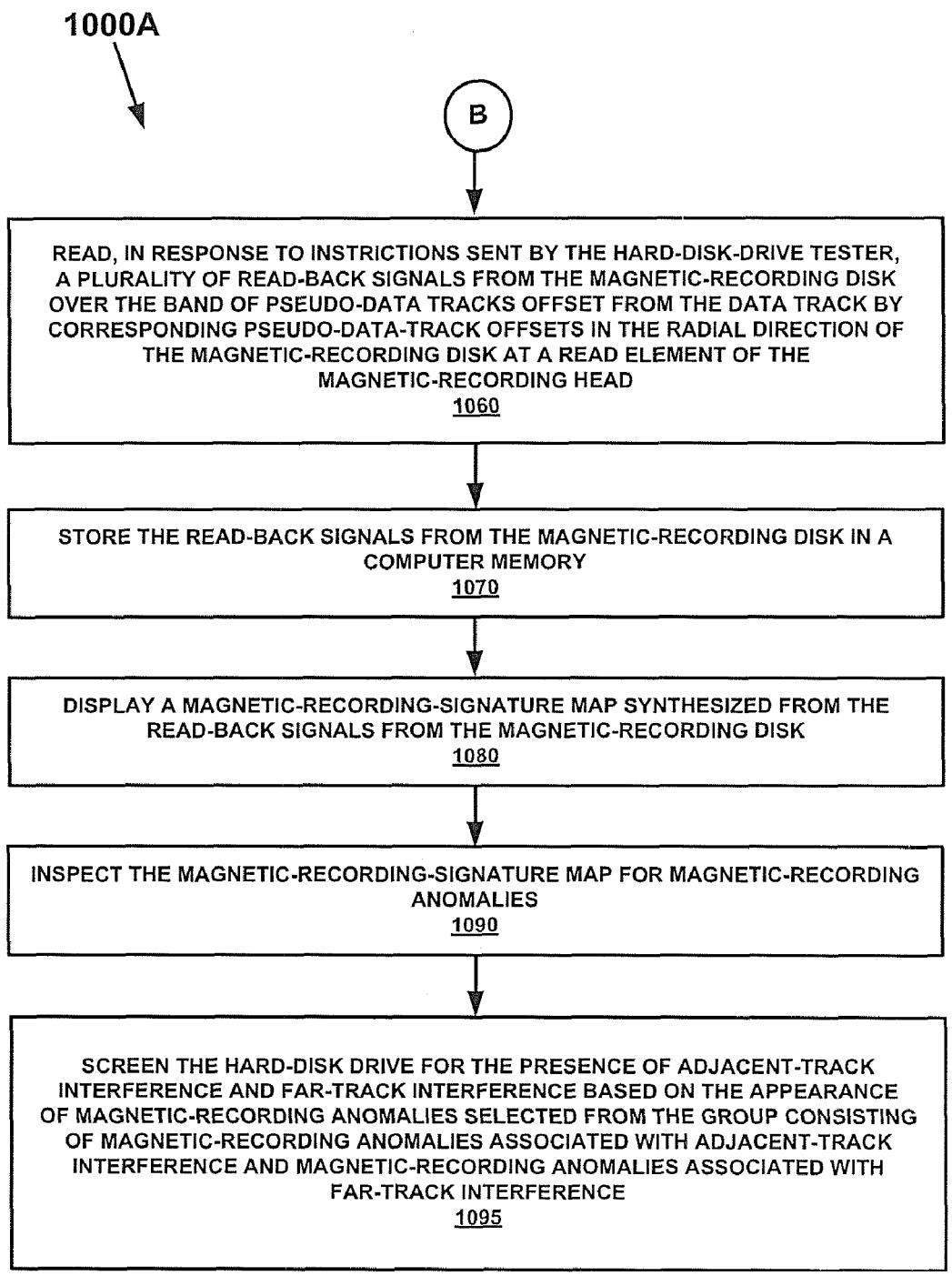
FIG. 10B is a continuation of the flow chart of FIG. 10A illustrating the method for manufacturing the HDD by characterizing the HDD for the presence of ATI and FTI in the environment of the manufacturing process of FIG. 9, in an embodiment of the present invention.
Figure 10C:
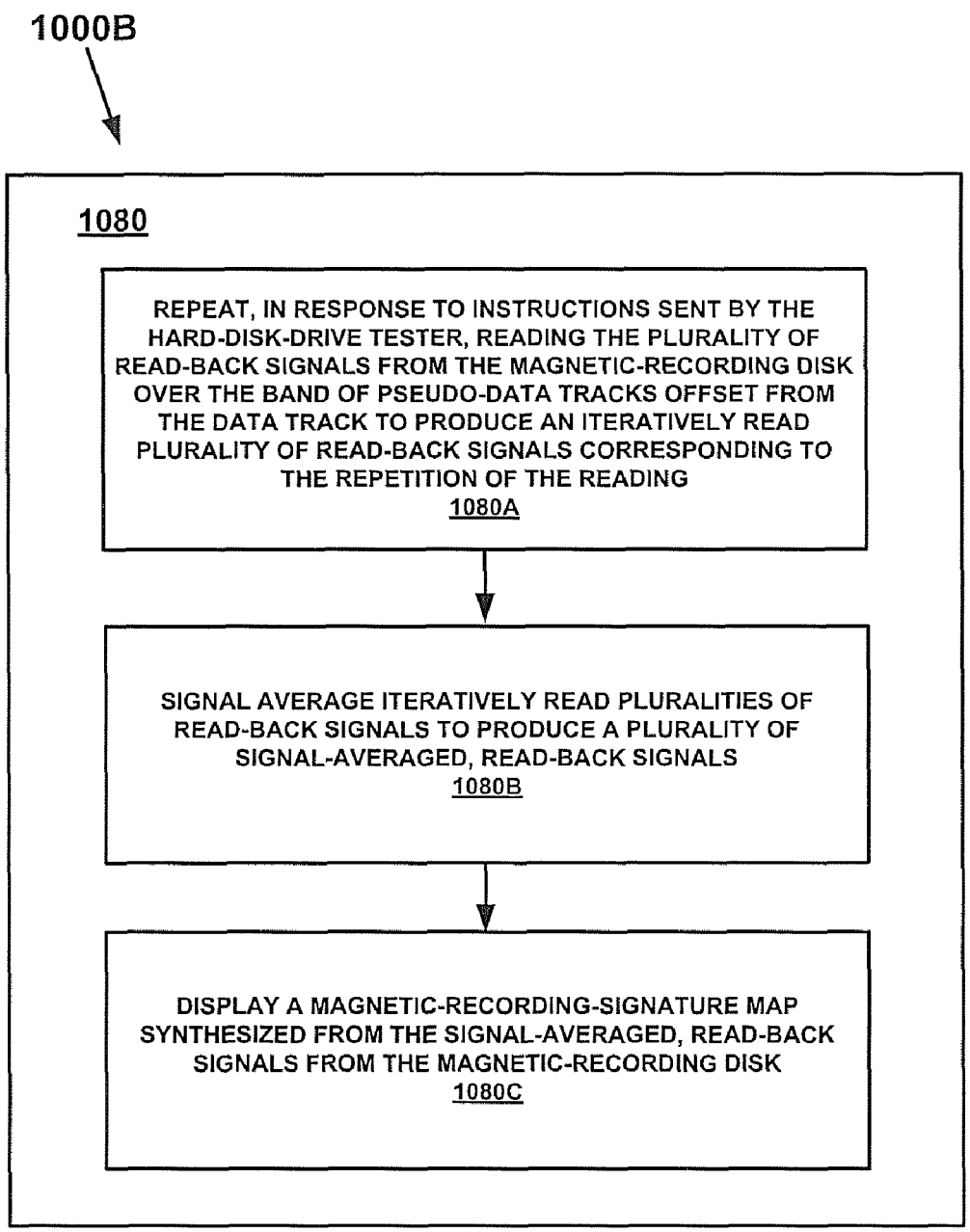
FIG. 10C is flow chart illustrating a further embodiment of the present invention for displaying the magnetic-recording-signature map in the method for manufacturing the HDD by characterizing the HDD for the presence of ATI and FTI in the environment of the manufacturing process of FIG. 9, in an embodiment of the present invention.

With reference now to FIGS. 10A, 10B and 10C, in accordance with an embodiment of the present invention, flow charts 1000A and 1000B illustrate the method for manufacturing a hard-disk drive by characterizing the hard-disk drive for the presence of ATI and FTI. At 1010, a HDD is selected for testing at a HDD tester. At 1020, the hard-disk-drive tester is connected to the hard-disk drive to receive instructions from the hard-disk-drive tester. At 1030, in response to instructions sent by the hard-disk-drive tester, a plurality of pseudo-data tracks over a band of pseudo-data-tracks offset from a data track by corresponding pseudo-data-track offsets in a radial direction of the magnetic-recording disk may be erased at a write element of the magnetic-recording head. The erasure may be by DC erasing, as described above in the discussion of FIG. 3B. At 1040, a plurality of repeating pulse-waveforms in the data track of the magnetic-recording disk is written at the write element of the magnetic-recording head. A pulse-waveform of the plurality of repeating pulse-waveforms includes a positive pulse portion, a positive plateau portion, a negative pulse portion and a negative plateau portion, as previously described in the discussion of FIG. 3A. The plurality of repeating pulse-waveforms has a low-frequency. The low frequency is defined by a distance between portions of the magnetic-recording disk written by pulse portions of the pulse-waveforms being greater than 100 nm, as described above in the discussion of FIG. 3A. The positive plateau portion of the pulse-waveform may be set at a level below a level sufficient to write the magnetic-recording disk. Similarly, the negative plateau portion of a pulse-waveform may be set at a level above a level sufficient to write the magnetic-recording disk. In addition, an outer bound of the band straddling either side of the data track lies outside of 70 nm on either side of the track-center of the data track. At 1050, in response to instructions sent by the HDD tester, writing the data track on the magnetic-recording disk with the plurality of repeating pulse-waveforms may be repeated. At 1060, in response to instructions sent by the hard-disk-drive tester, a plurality of read-back signals from the magnetic-recording disk over a band of pseudo-data-tracks offset from the data track by corresponding pseudo-data-track offsets in a radial direction of the magnetic-recording disk are read at a read element of the magnetic-recording head. At 1070, the read-back signals from the magnetic-recording disk may be stored in a computer memory. At 1080, a magnetic-recording-signature map that is synthesized from the read-back signals from the magnetic-recording disk is displayed. At 1090, the magnetic-recording-signature map is inspected for magnetic-recording anomalies. At 1095, the HDD is screened for the presence of ATI and FTI based on the appearance of magnetic-recording anomalies selected from the group consisting of magnetic-recording anomalies associated with ATI and magnetic-recording anomalies associated with FTI.

With further reference to FIG. 10B and block 1095 of the flow chart 1000A, in accordance with an embodiment of the present invention, a suggested selection criteria for screening a HDD for the presence of ATI and FTI is that the amplitude of the read-back signal at the hot spot reaches a threshold level of the amplitude of the read-back signal at the track-center of the data track written with the pulse portion of the pulse-waveform. The threshold level may be some fraction of the amplitude of the read-back signal at the track-center of the data track written with the pulse portion of the pulse-waveform, for example, 10% of the maximum amplitude of the read-back signal of the portion of the data track at the track-center written with the pulse portion of the pulse-waveform. For example, a HDD exhibiting a hot spot located outside of the track width of the data track, for example, greater than +70 nm above the track-center or less than −70 nm below the track-center of a data track with a track width of 140 nm, having an amplitude that is 10% of the maximum amplitude of the read-back signal of the portion of the data track at the track-center written with the pulse portion of the pulse-waveform would be selected for removal from the manufacturing process, as a defective HDD. Notwithstanding the preceding discussion, the threshold level selected for screening may depend on the specific drive design so that the level of 10% described above is for purposes of example and not limitation, as other threshold levels are within the spirit and scope of embodiments of the present invention. Alternatively, the selection criterion may be subjective, being dependent upon the experience and skill of the analyst viewing the magnetic-recording-signature map in identifying hot spots associated with ATI and FTI. For example, based on an analyst's experience and skill, an analyst may recognize a particular hot-spot morphology as signifying the presence of ATI, or FTI, and would make a selection of an HDD exhibiting a hot spot with such significative morphology as a defective HDD, or alternatively as a possible candidate for salvage by rework.

With reference now to FIG. 10C, in accordance with an embodiment of the present invention, flow chart 1000B illustrates a further embodiment of the present invention for displaying 1080 the magnetic-recording-signature map in a method for manufacturing a hard-disk drive by characterizing the hard-disk drive for the presence of ATI and FTI. At 1080A, in response to instructions sent by the hard-disk-drive tester, reading the plurality of read-back signals from the magnetic-recording disk over the band of pseudo-data tracks offset from the data track is repeated to produce an iteratively read plurality of read-back signals corresponding to the repetition of the reading. At 1080B, the iteratively read pluralities of read-back signals are signal averaged to produce a plurality of signal averaged, read-back signals. At 1080C, a magnetic-recording-signature map that is synthesized from the signal-averaged, read-back signals from the magnetic-recording disk is displayed.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for characterizing a magnetic-recording system for the presence of adjacent-track interference and far-track interference, said method comprising:
   writing a plurality of repeating pulse-waveforms on a data track of a magnetic-recording disk at a write element of a magnetic-recording head;
   reading a plurality of read-back signals from said magnetic-recording disk over a band of pseudo-data tracks offset from said data track by corresponding pseudo-data-track offsets in a radial direction of said magnetic-recording disk at a read element of said magnetic-recording head; and
   displaying a magnetic-recording-signature map synthesized from said read-back signals from said magnetic-recording disk, wherein said displaying said magnetic-recording-signature map comprises:
   repeating said reading said plurality of read-back signals from said magnetic-recording disk over said band of pseudo-data tracks offset from said data track to produce an iteratively read plurality of read-back signals corresponding to said repeating of said reading;
   signal averaging iteratively read pluralities of read-back signals to produce a plurality of signal-averaged, read-back signals; and
   displaying a magnetic-recording-signature map synthesized from said signal-averaged, read-back signals from said magnetic-recording disk.

2. The method recited in claim 1, wherein said plurality of repeating pulse-waveforms has a low-frequency, said low frequency defined by a distance between portions of said magnetic-recording disk written by pulse portions of said pulse-waveforms being greater than 100 nm.

3. The method recited in claim 1, wherein a pulse-waveform of said plurality of repeating pulse-waveforms further comprises a positive pulse portion, a positive plateau portion, a negative pulse portion and a negative plateau portion.

4. The method recited in claim 3, wherein said positive plateau portion is set at a level below a level sufficient to write said magnetic-recording disk; and
   said negative plateau portion is set at a level above a level sufficient to write said magnetic-recording disk.

5. The method recited in claim 1, wherein an outer bound of said band straddling either side of said data track lies outside of 70 nm on either side of a track center of said data track.

6. The method recited in claim 1, further comprising:
   erasing a plurality of pseudo-data tracks over a band of pseudo-data tracks offset from said data track by said corresponding pseudo-data-track offsets in said radial direction of said magnetic-recording disk at said write element of said magnetic-recording head;
   wherein said erasing is a DC erasing.

7. The method recited in claim 1, further comprising:
   repeating said writing said data track on said magnetic-recording disk with said plurality of repeating pulse-waveforms.

* * * * *